United States Patent
Rao et al.

(10) Patent No.: US 8,413,087 B1
(45) Date of Patent: Apr. 2, 2013

(54) METHOD AND MECHANISM FOR IMPLEMENTING REGION QUERY USING HIERARCHICAL GRIDS

(75) Inventors: Guruprasad G. Rao, Pleasanton, CA (US); Mark Hahn, Fremont, CA (US); Laurent Volpe, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 140 days.

(21) Appl. No.: 12/748,172

(22) Filed: Mar. 26, 2010

(51) Int. Cl.
*G06F 17/50* (2006.01)

(52) U.S. Cl. .......................................... 716/105

(58) Field of Classification Search .................. 716/100, 716/105
See application file for complete search history.

(56) References Cited

U.S. PATENT DOCUMENTS

| | | | |
|---|---|---|---|
| 4,754,408 A | 6/1988 | Carpenter | |
| 5,528,508 A | 6/1996 | Russell et al. | |
| 6,009,251 A | 12/1999 | Ho | |
| 6,049,799 A | 4/2000 | Mangat | |
| 6,341,277 B1 | 1/2002 | Coden et al. | |
| 6,493,858 B2 * | 12/2002 | Solomon | 716/119 |
| 6,516,456 B1 | 2/2003 | Garnett et al. | |
| 6,526,455 B1 | 2/2003 | Kamimura | |
| 6,581,195 B2 | 6/2003 | Tanaka | |
| 6,631,508 B1 | 10/2003 | Williams | |
| 6,823,300 B1 | 11/2004 | Ferreri | |
| 6,886,148 B2 * | 4/2005 | Solomon | 716/139 |
| 6,944,829 B2 | 9/2005 | Dando | |
| 6,983,440 B1 | 1/2006 | Nequist | |
| 7,010,518 B1 | 3/2006 | Bedell et al. | |
| 7,016,910 B2 | 3/2006 | Egilsson et al. | |
| 7,054,873 B2 | 5/2006 | Nordstrom | |
| 7,082,589 B2 | 7/2006 | Saunders | |
| 7,443,401 B2 | 10/2008 | Blanco | |
| 7,519,596 B2 | 4/2009 | Gavrilov | |
| 7,623,711 B2 | 11/2009 | Berkner | |
| 7,895,216 B2 | 2/2011 | Longshaw et al. | |
| 7,952,583 B2 | 5/2011 | Waechter et al. | |
| 8,019,561 B1 | 9/2011 | Sahrling | |
| 8,028,263 B2 | 9/2011 | Chong | |
| 2002/0162081 A1 * | 10/2002 | Solomon | 716/11 |
| 2003/0076722 A1 * | 4/2003 | Solomon | 365/200 |
| 2005/0114313 A1 | 5/2005 | Campbell | |
| 2005/0204315 A1 | 9/2005 | Knol et al. | |
| 2006/0277520 A1 | 12/2006 | Gennari | |
| 2009/0031261 A1 | 1/2009 | Smith et al. | |
| 2009/0216450 A1 * | 8/2009 | Sakamoto et al. | 702/1 |
| 2009/0288059 A1 | 11/2009 | Dimou et al. | |

OTHER PUBLICATIONS

Non Final Office Action Mailed on Mar. 28, 2012 for U.S. Appl. No. 12/978,216.
Non Final Office Action Mailed on Mar. 19, 2012 for U.S. Appl. No. 12/748,196.

(Continued)

*Primary Examiner* — Suchin Parihar
(74) *Attorney, Agent, or Firm* — Vista IP Law Group, LLP

(57) ABSTRACT

Disclosed is an improved approach for managing, tracking, and querying hierarchical data in layouts. According to some aspects, hierarchical grids are employed utilizing a scheme that organizes physical objects into a set of gradually refined grids that avoids the need to maintain duplicates while enhancing the desirable characteristics of existing schemes, including fast query times, fast data structure initialization and reduced memory footprint. Each grid-cell may be further partitioned into sub-containers to more efficiently provide space pruning during query operations. According to one approach, structures maintained to track existence of objects in a descendent hierarchy.

30 Claims, 34 Drawing Sheets

OTHER PUBLICATIONS

Non-Final Office Action dated May 1, 2012 for U.S. Appl. No. 12/978,302.
Final Office Action dated Jul. 31, 2012 for U.S. Appl. No. 12/748,196.
Final Office Action dated Aug. 9, 2012 for U.S. Appl. No. 12/978,302.
Non-Final Office Action dated Aug. 14, 2012 for U.S. Appl. No. 12/978,216.
Notice of Allowance dated Jan. 31, 2013 for U.S. Appl. No. 12/978,216.

* cited by examiner

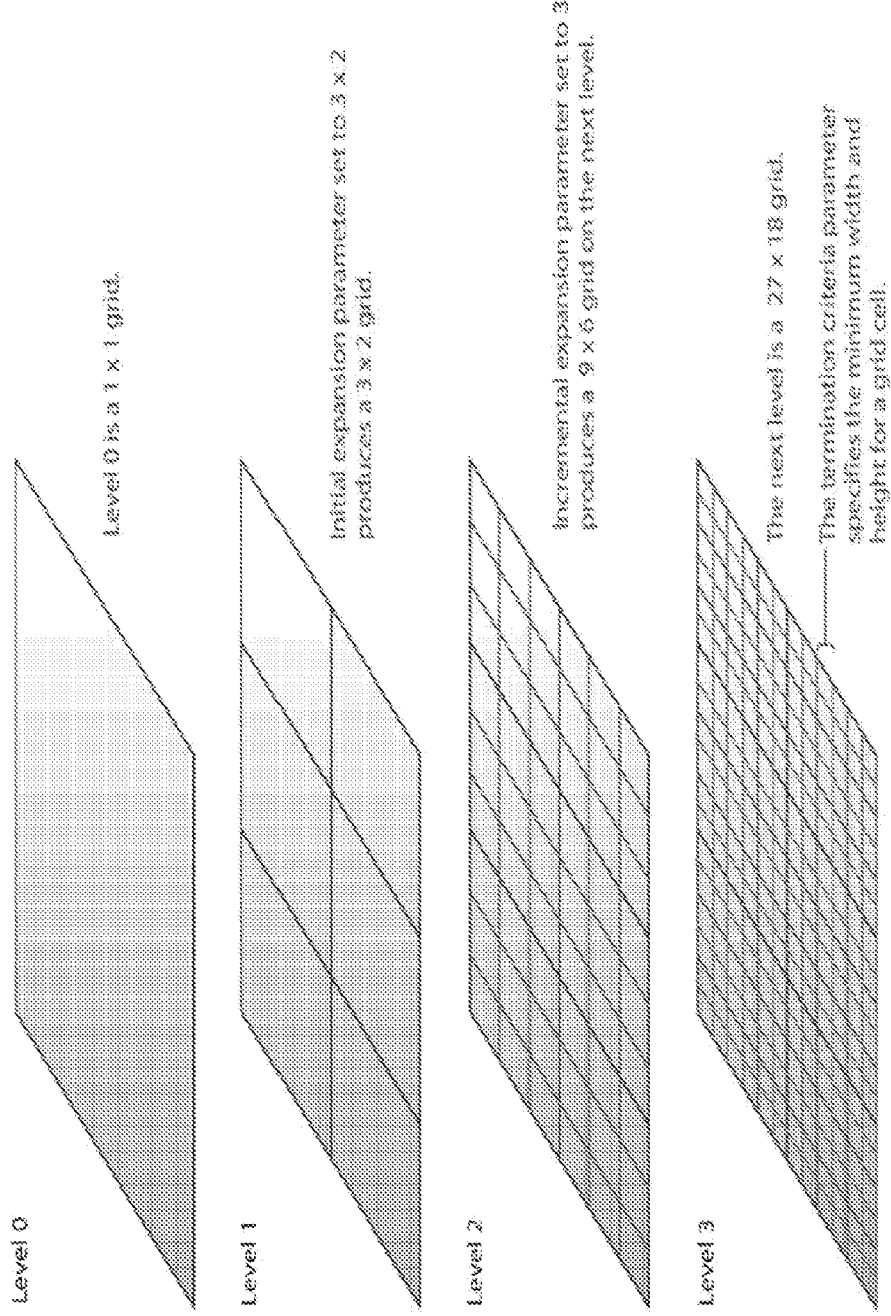

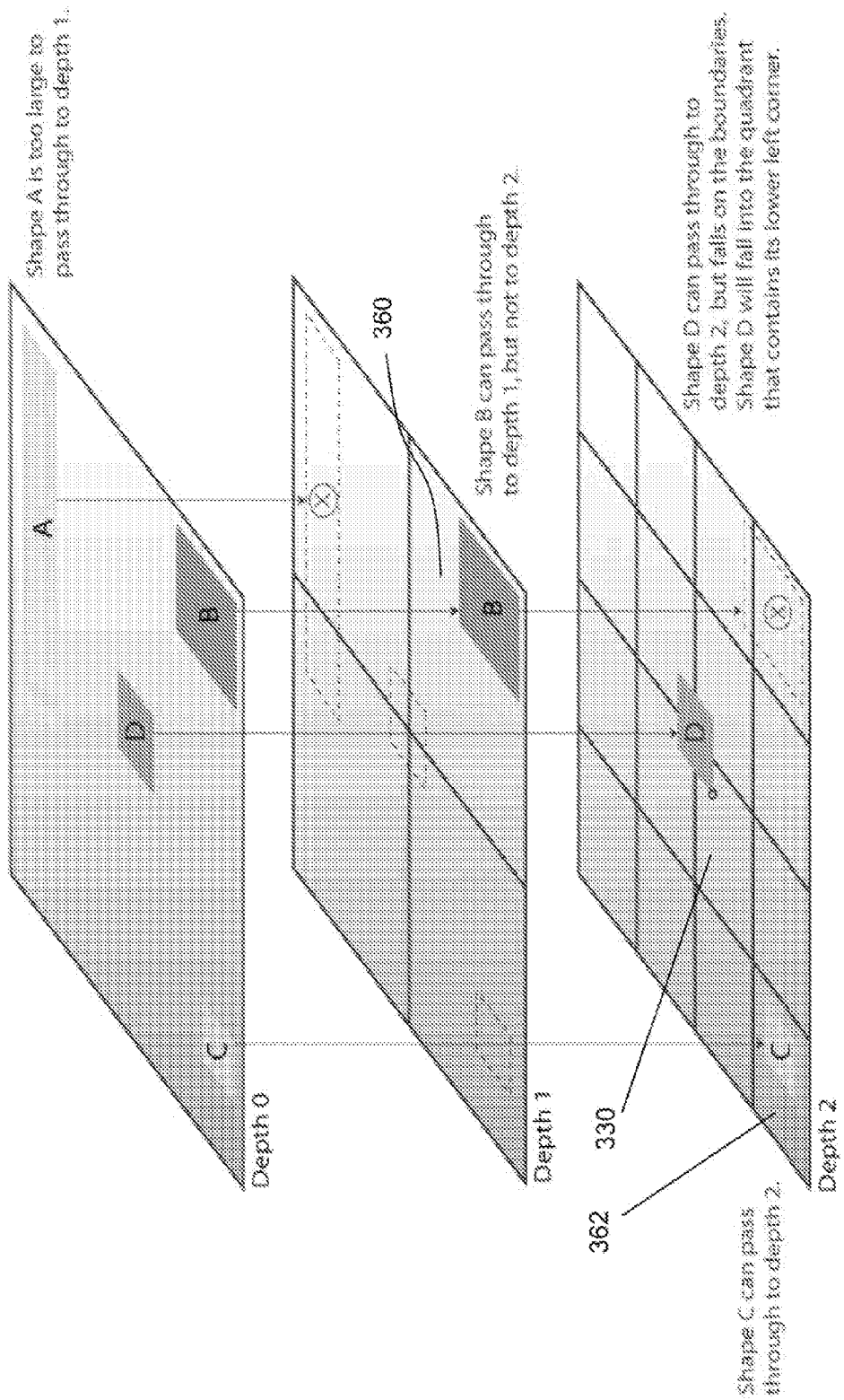

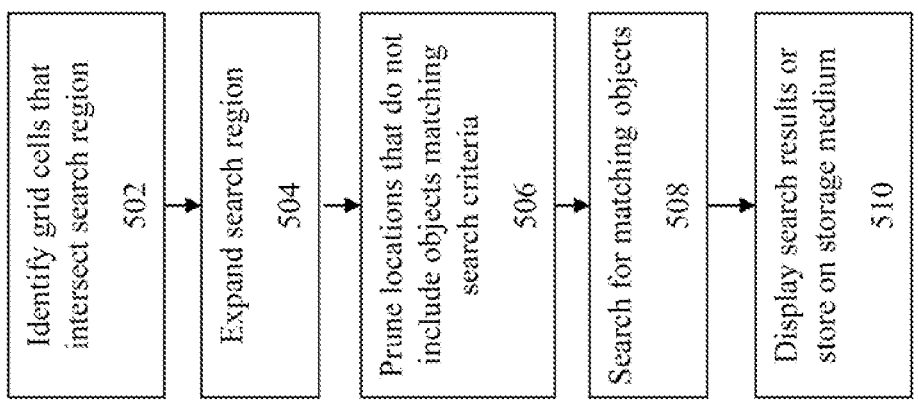

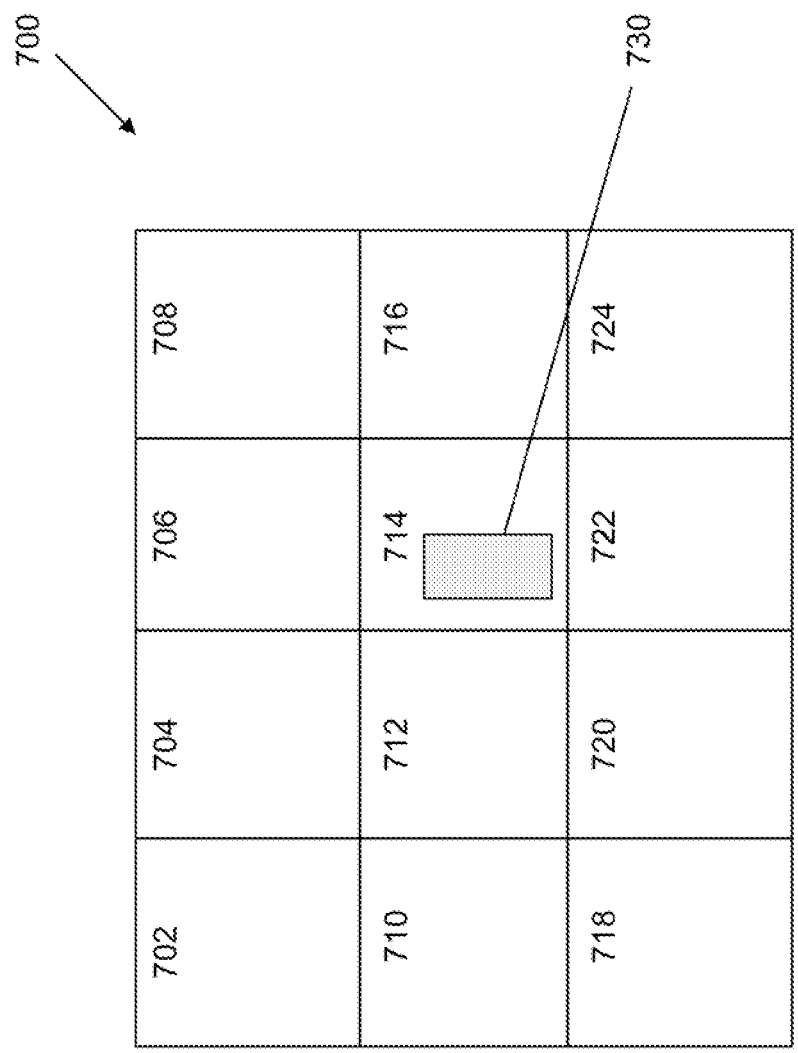

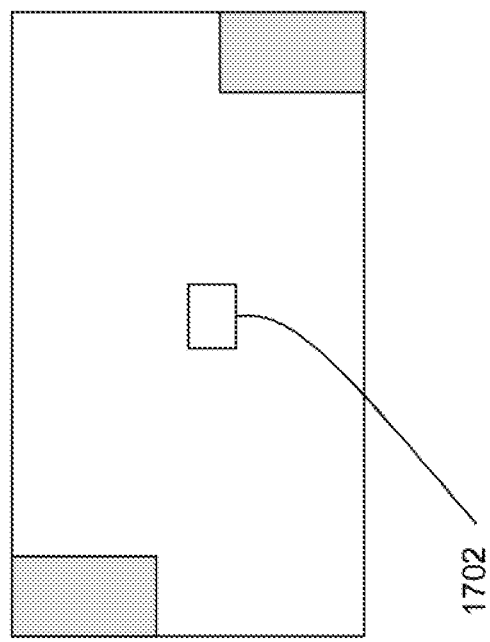

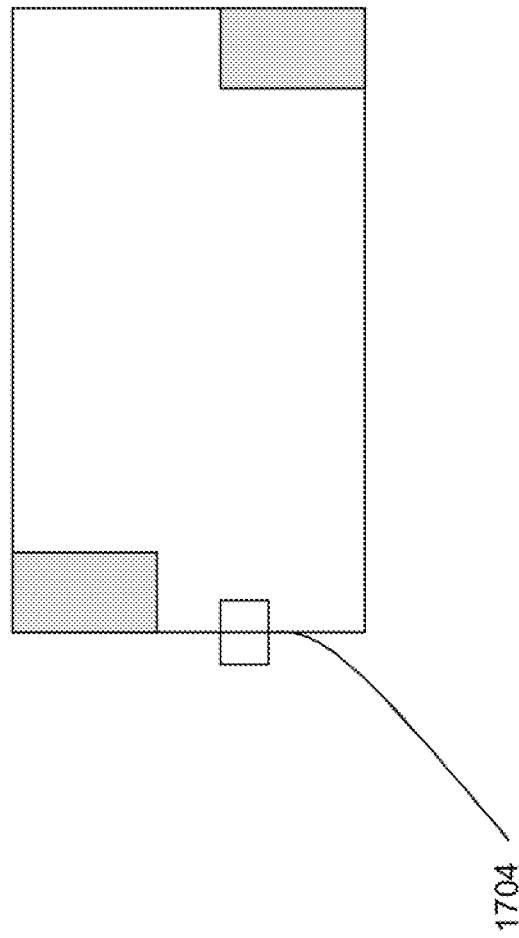

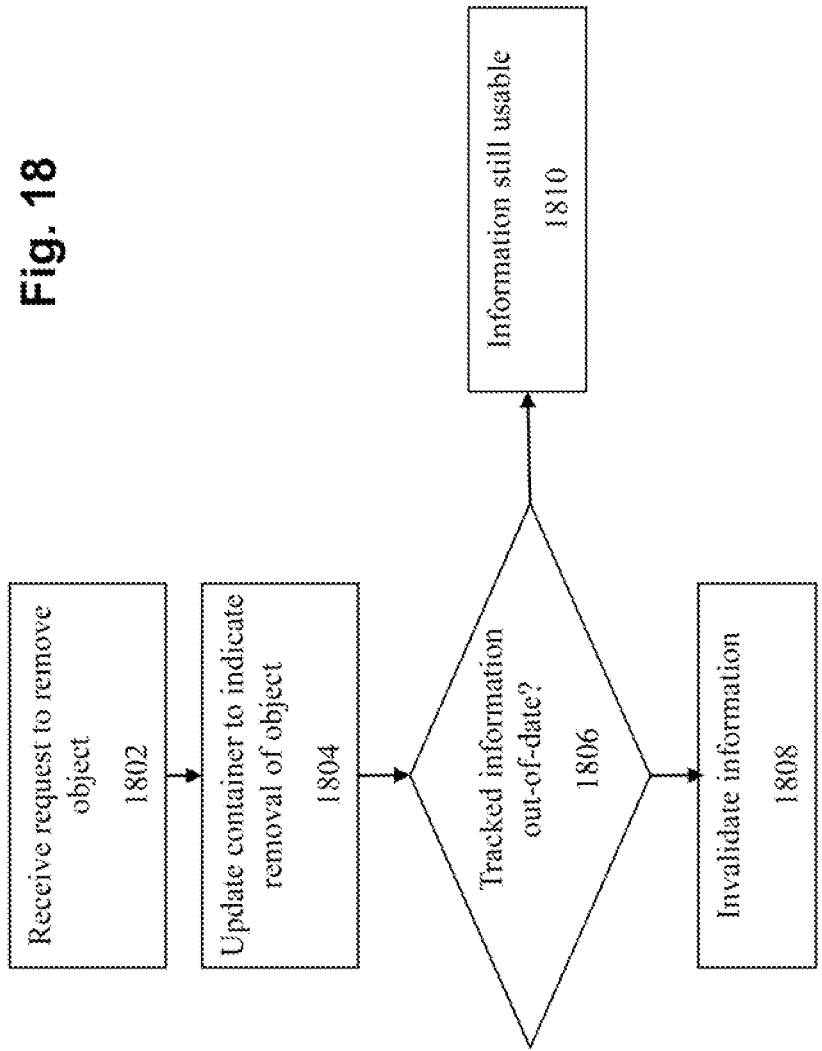

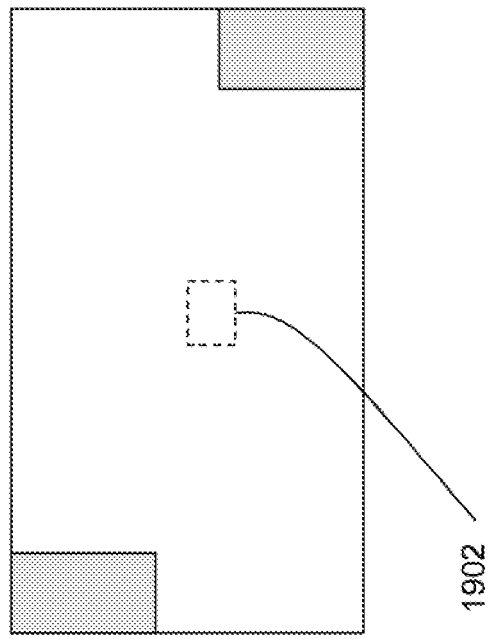

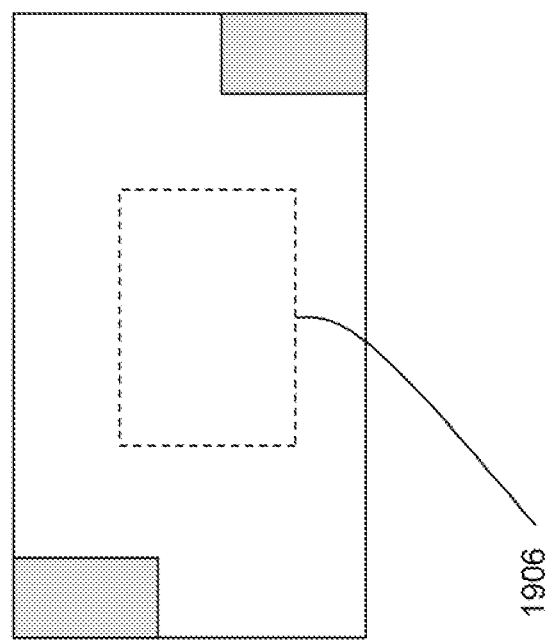

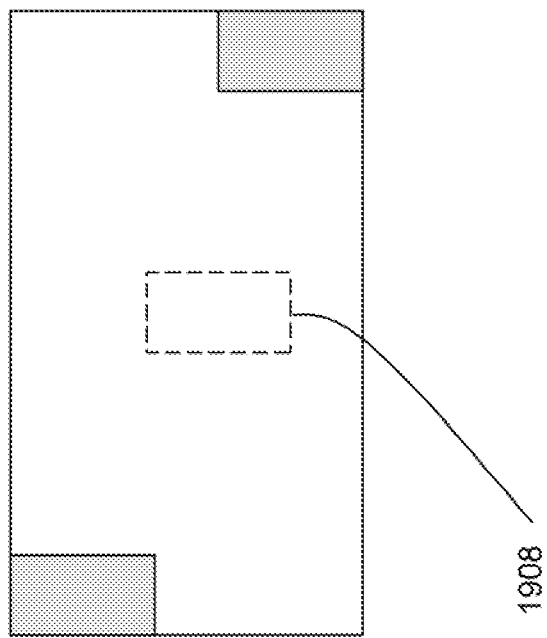

1910

METHOD AND MECHANISM FOR IMPLEMENTING REGION QUERY USING HIERARCHICAL GRIDS

CROSS-REFERENCE TO RELATED APPLICATIONS

The present application is related to U.S. application Ser. No. 12/748,196, entitled "METHOD AND MECHANISM FOR MAINTAINING EXISTENCE INFORMATION FOR ELECTRONIC LAYOUT DATA", which is hereby incorporated by reference in its entirety.

FIELD OF THE INVENTION

The present invention relates generally to electronic circuit designs.

BACKGROUND OF THE INVENTION

An integrated circuit (IC) has a large number of electronic components, such as transistors, logic gates, diodes, wires, etc., that are fabricated by forming layers of different materials and different geometric shapes on various regions of a wafer. The design of an integrated circuit transforms a circuit description into a geometric description called a layout. Layouts of complex chips have a very large number of individual shapes that are arranged in precise configurations to meet functional, electrical, performance and manufacturing specifications. The number of individual shapes has increased significantly as manufacturing concerns lead to the creation of new features like array instances for fill shapes.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example. Geometric information about the placement of the nodes and components onto the chip is determined by a placement process and a routing process. The placement process is a process for placing electronic components or circuit blocks on the chip and the routing process is the process for creating interconnections between the blocks and components according to the specified netlist.

IC layouts are often constructed in a hierarchical fashion, in which a master design of a particular geometric element is created once, but where one or more instances (or occurrences) of the geometric element may be inserted into various locations and levels within the IC design. In this type of approach, the IC layout is hierarchically set out by re-using elements over and over again. Rather than copying duplicates of the same geometric element everywhere that it is used, instances of the elements are inserted in the appropriate locations that logically reference the appropriate master design. In the hierarchical approach, each instance provides a logical reference to its master design rather than a physical manifestation of the design at the instance locations. Some IC design systems distinguish between different types of hierarchical reuse, optimizing the representation for types of geometry that are heavily used, such as vias and contacts used to establish physical connections between different layers.

An advantage of this approach is improved efficiency with respect to memory usage when storing design data for an IC design. Memory efficiencies are gained since instances of an element are used and placed in the design, rather than requiring a full copy of that element to be duplicated numerous times in the design data.

However, the hierarchical nature of this approach can also cause inefficiencies when attempting to access the design data. As just one example, consider the process to search a portion of the IC design for the shapes within a particular search area. The search area may encompass parts of one or more instances in the design. However, only a subset of the shapes within the instances may actually fall within the search area. Because the shapes are not actually stored at each level, the search process may need to traverse the entire hierarchy of the corresponding instances on every layer and their nested instances to confirm which shapes in the instances overlap the search area, even through portions of the hierarchy that may not contain any shapes at the correct layer or design area. Depending upon the complexity of the design, this could be a very lengthy and expensive process.

In an alternate approach, the design hierarchy can be flattened so that the design data is not hierarchical in nature. In this approach, rather than inserting instances of elements into the design, actual copies of the elements are placed in the appropriate locations within the design data. The advantage of this approach is that it is very efficient to search the flattened design data, since chains of instances do not need to be followed to identify shapes within a search area. However, if the design includes a large number of geometric elements, then this approach may also consume an excessive amount of memory and storage resources. For at least this reason, it is often desirable to maintain the hierarchical nature of the electronic design (it is noted that there are also other reasons to preserve the hierarchy of the design, such as the desirability to reuse IP blocks and to minimize the complexity of changing a part of the design).

There are many types of EDA tools that need to be able to efficiently access hierarchical design data. For example, a layout editor is a tool that allows designers to view and modify components of the design at various levels of precision and control. Fundamentally, a layout editor operates to present some or all of a layout to a user, where the displayable portion of the layout is defined based upon some control or direction provided by the user which allows the tool to identify the specific objects on the specific layers and hierarchical levels that need to be displayed. Therefore, the layout editor must be able to efficiently query the layout database to find these objects in the hierarchical design data.

To accomplish this goal, design data should be organized in a scheme that is beneficial to the performance and memory footprint of such tools. The "Region Query" problem relates to the efficient organization of physical data for use in layout editors and other applications that depend upon repeated queries for objects contained in a specific region of the chip. Auxiliary structures are often maintained to facilitate the region query, where the auxiliary structures are distinct from the layout data that is physically stored for the design. The region query data structures can be thought of as an overlay that provides efficient access to subsets of the layout data, without changing the layout data itself.

A typical approach to implement auxiliary structures for the region query problem is to divide the chip into smaller partitions and to represent the components that overlap the partition as individual elements. The query problem reduces to an overlap detection problem—overlapping elements in partitions that overlap the query region are returned by the query. Elements that overlap multiple partitions are represented as duplicate references in all but one of those partitions, distinct from the original references on the partition for elements that are wholly contained in that partition. This approach breaks down with the introduction of fill (e.g., dummy or metal fill) for DFM (design for manufacturing) purposes. A particular technique to introduce fill is to create large array instances of fill shapes that are overlaid on top of the design. These instances appear as duplicates in every partition in the design, where such duplicates correspond to duplicated references in different partitions to the same underlying object in the layout that are large enough to intersect the area of each of those partitions. The proliferation of duplicates in this manner leads to an unacceptable increase in memory footprint, runtime and query time.

Conventional approaches to the Region Query problem use the divide and conquer principle, in which the entire chip is partitioned into smaller regions of variable or equal size. Each partition may be further decomposed into more partitions leading to a hierarchical decomposition of the space. The number of partitions at each level of the hierarchy may be fixed or may adapt to the size and organization of the data set. Objects that straddle multiple partitions may be represented as duplicates or may be represented only once in a higher level of the hierarchy. Design data is itself hierarchical, organized as instances of reusable child designs in parent designs. To avoid the need to descend through the entire hierarchy to query for objects on a specific layer, shadow views may be maintained to provide an aggregated view of all the objects below an instance of interest. The shadow view may be maintained on a per layer basis or based on a combination of a layer and a purpose. In addition, some types of geometric objects can be aggregated into a shadow view by type without regard to layer. Maintaining shadow views per layer for every design loaded in memory is expensive in terms of memory, initialization time and the effort required to maintain the integrity of the views during subsequent edits on the design hierarchy.

The conventional approaches to this problem all suffer from performance deficiencies. Several of these approaches will now be described with specific reference to their performance attributes based on factors such as memory footprint (VM), time required to initialize the Region Query auxiliary structures (initialization time), and queries of various sizes (full, large, medium, small).

The Binary or XY tree approach is based upon a variable sized, hierarchical, adaptive scheme that recursively splits the chip area, and maintains a single reference to each object while not maintaining shadow views. While the VM is small in this approach, the initialization time and query performance are quite poor.

The Quad Tree approach utilizes an equal sized, hierarchical, fixed structure that recursively splits the chip area into quadrants, maintains duplicate references to objects and does not maintain shadow views. One significant problem with this approach is that VM is large due to the duplicates maintained on all overlapping partitions at a level of hierarchy, even though the initialization time and query performance is better than the XY Tree.

The Zone Tree approach uses a variable sized, flat scheme that maintains duplicate references to objects and maintains shadow views. The VM is large due to the duplicates, and the initialization time is worse than Quad Tree, but the query performance is significantly better than either XY or Quad Trees due to the shadow views and the limited number of partitions that must be searched for overlapping objects of interest.

Therefore, there is a need for an improved approach to managing and querying layout data.

SUMMARY

Embodiments of the present invention provides an improved approach for managing, tracking, and querying hierarchical data in layouts. According to some embodiments of the invention, hierarchical grids are employed in a scheme that organizes physical objects into a set of gradually refined grids which avoids the need to maintain duplicates while enhancing the desirable characteristics of existing schemes, including fast query times, fast data structure initialization and reduced memory footprint. Each container, e.g., grid-cell may be further partitioned to more efficiently provide space pruning during query operations. According to one embodiment, structures maintained to track existence of objects in a descendent hierarchy.

Other objects, features, and advantages of the invention are described in the detailed description, figures, and claims:

BRIEF DESCRIPTION OF THE DRAWINGS

The drawings illustrate the design and utility of embodiments of the present invention, in which similar elements are referred to by common reference numerals. In order to better appreciate the advantages and objects of a preferred embodiment, reference should be made to the accompanying drawings that illustrate this preferred embodiment. However, the drawings depict only one embodiment of the invention, and should not be taken as limiting its scope.

FIGS. 3B-C illustrates an embodiment of a process for utilizing hierarchical grids according to one embodiment of the invention.

FIG. 5 is a flowchart of a process for performing a query against a hierarchical grid according to one embodiment of the invention.

FIGS. 6A-B, 7, and 8 illustrate aspects of query operations according to one embodiment of the invention.

FIGS. 17A-C shows example scenarios of added objects.

FIG. 18 shows a flowchart of an approach for removing an object.

FIGS. 19A-E shows example scenarios of removed objects

DETAILED DESCRIPTION

The present invention provides an improved approach for managing, tracking, and querying hierarchical data in layouts. According to some embodiments of the invention, the invention is implemented using hierarchical grids which are configured to organize physical objects in a set of gradually refined grids that avoids the need to maintain duplicates while enhancing the desirable characteristics of existing schemes.

As noted above, a completely flat storage mechanism is forced to find efficient ways to manage duplicates. A hierarchical representation provides different views of the same space that accommodates objects of different dimensions. This allows a hierarchical representation to better manage large objects by eliminating the need for duplicates.

The present approach of using hierarchical grids can be viewed as a stack of sieves through which objects can be filtered. The sieves may be aligned or un-aligned. Objects stop at the point where the dimensions of a grid-cell at a particular level accommodate the dimensions of the object. This ensures that there is a canonical assignment of an object to a specific depth for a given set of grid levels and their characteristics.

The hierarchical grids according to some embodiments use an equal space partitioning strategy which explicitly gives up the benefit of adaptability, since this type of structure is not naturally balanced. It is possible for one space partition to have a significantly larger number of elements than another space partition. To compensate for this, embodiments of the hierarchical grids approach employs a two-level search mechanism where elements within a space partition are kept in logical element partitions that allow the query mechanism to skip extraneous elements that do not match the specified search criterion.

Figure 1:
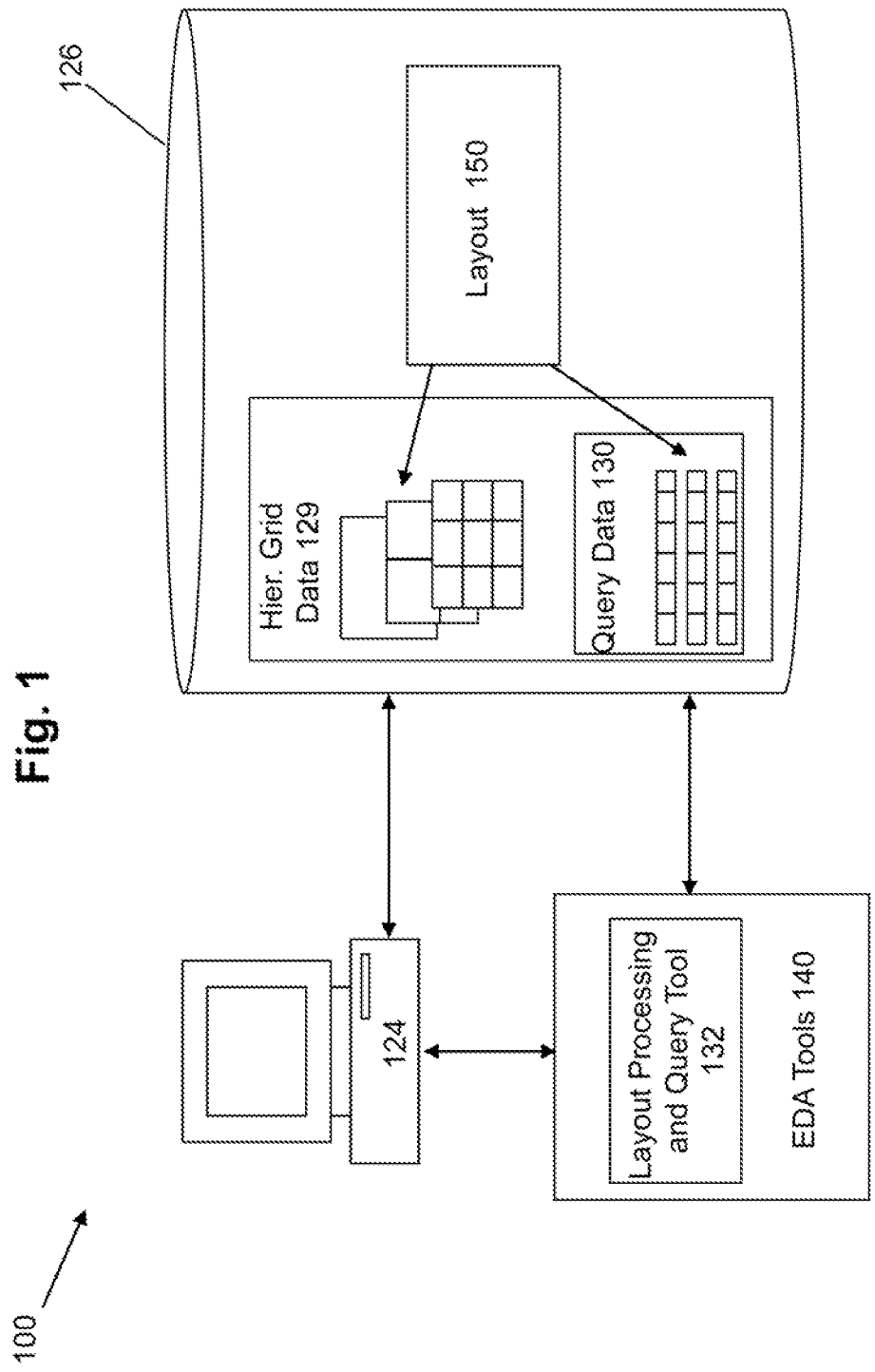
FIG. 1 illustrates a system for implementing region queries using hierarchical grids according to one embodiment of the invention.

FIG. 1 illustrates an example system 100 which may be employed in some embodiments of the invention to implement hierarchical grids. System 100 may include one or more users at one or more user stations 124 that operate the system 100 to design or edit electronic designs. Such users include, for example, design engineers or verification engineers. User station 124 comprises any type of computing station that may be used to operate, interface with, or implement EDA applications or devices. Examples of such user stations 124 include for example, workstations, personal computers, or remote computing terminals. User station 124 comprises a display device, such as a display monitor, for displaying electronic design layouts and processing results to users at the user station 124. User station 124 also comprises one or more input devices for the user to provide operational control over the activities of system 100, such as a mouse or keyboard to manipulate a pointing object in a graphical user interface.

The electronic designs comprising a layout 150 may be stored in a computer readable storage device 126. Computer readable storage device 126 comprises any combination of hardware and software that allows for ready access to the data that is located at the computer readable storage device 126. For example, computer readable storage device 126 could be implemented as computer memory operatively managed by an operating system. The computer readable storage device 126 could also be implemented as an electronic database system having storage on persistent and/or non-persistent storage, e.g., where the layout 150 is stored in a database on a storage device where the database is compliant with the Open Access standards, which is a standard often used in conjunction with EDA tools and electronic designs, the specifications of which are available from the Silicon Integration Initiative at www.si2.org.

One or more EDA tools 140, such as a layout processing and query tool 132 (e.g., a layout editor), may be used by users at a user station 124 to access layout 150. Any suitable computer aided design (CAD) tool or electronic design automation (EDA) design tool can be employed within the scope of system 100.

According to embodiments of the invention, the layout 150 is managed using a set of hierarchical grids 129 logically organized as a stack of sieves through which objects can be filtered. Additional organizational and tracking data 130 are further utilized as part of or in conjunction with hierarchical grids 129 to optimize the storage and querying of the layout data 150. For example, for balancing purposes, some or all of the hierarchical grids may be further partitioned into smaller logical partitions. According to some embodiments, data 130 comprises information for tracking and managing the logical partitions within the hierarchical grids.

Figure 2:
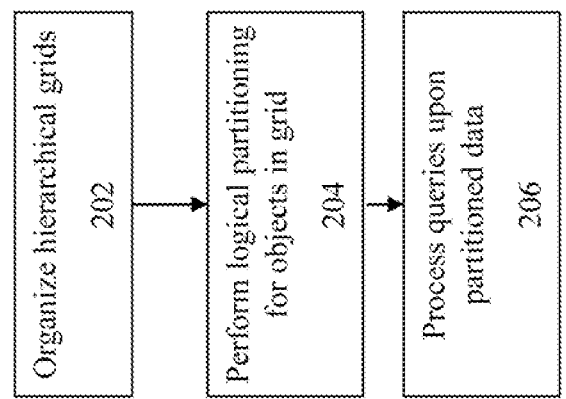
FIG. 2 is a flowchart of a process for implementing region queries using hierarchical grids according to one embodiment of the invention.

FIG. 2 shows a high level diagram of a process for managing and querying layout data according to some embodiments of the invention. At 202, a system of hierarchical grids is organized to manage the layout data. The hierarchical grids are logically organized as a stack of sieves through which objects can be filtered. Objects stop at the point where the dimensions of a grid-cell at a particular level accommodate the dimensions of the object. On the assigned level, objects are assigned to the grid-cell that contains the lower-left coordinate of the object. This ensures that there is a canonical assignment of an object to a particular grid-cell at a specific depth for a given set of grid levels and their characteristics. Other embodiments could use different approaches to create a canonical assignment.

At 204, logical partitioning is performed for objects in some or all of the grid-cells within the hierarchical grid. This action can be performed selectively if the number of objects within a grid container exceeds a threshold quantity or density value. This action can also be configured to occur for every grid-cell without specifically checking for the density or quantity of objects within that container. As pointed out in the previous sections, an equal partitioning strategy does not always provide topological support for balancing. In other words, the space partitioning strategy does not naturally limit the number of objects in each space partition to a manageable size. Therefore, this action is taken to provide balancing within the hierarchical grid to ensure consistent query times on dense and sparse parts of the design.

Once the layout data has been organized into the hierarchical grids, then at 206, queries may be processed against that data. For example, consider a layout editor tool that allows designers to view and modify components of the design at various levels of precision and control to meet these specifications. The designer may seek to view a portion of a design using a search box that is created or moved over a certain section of the layout. The search box effectively provides a bounding box for which the tool will need to identify objects that are at least partially contained within the boundaries of that box. Each of these actions 202, 204, and 206 are described in further detail below.

Figure 3A:
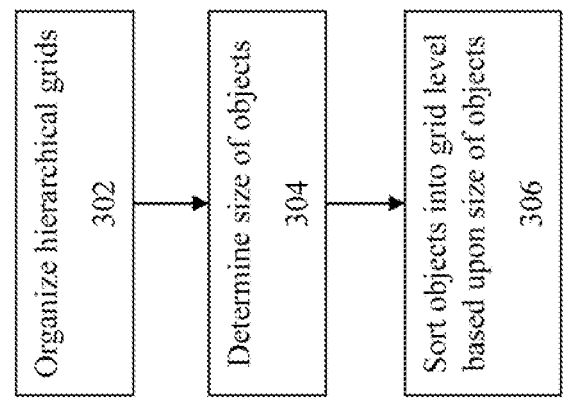
FIG. 3A is a flowchart of a process for implementing hierarchical grids according to one embodiment of the invention.

FIG. 3A shows a flowchart of a process for performing action 202 of FIG. 2 for organizing a hierarchical grid according to some embodiments of the invention. At 302, the structure of the hierarchical grid is created in which multiple levels of the grid are created, where each level implies a different grid resolution. According to the present embodiment, each successive level of the grid corresponds to a smaller grid resolution. The size of each grid-cell at each level is fixed. According to other embodiments, the number of grid levels and the size of the grid-cells at each level could be determined adaptively based on the characteristics of the layout, using a heuristic or an optimization algorithm to determine an optimal structure for a particular objective or set of objectives.

The use of a hierarchy to partition elements into different levels requires the consistent application of association rules. These rules must be canonical, e.g., with a known number of levels and the size of the grid-cells at each level, it is possible to immediately determine the depth and grid-cell to which this element will be assigned. The following are example rules that can be used in some implementations of hierarchical grids:

Depth Association rule—objects are assigned to the lowest depth where they will fit within the grid cell.

Grid-cell Association rule—objects are assigned to the grid-cell that contains the object's lower left coordinate.

An example of a hierarchical grid structure is pictorially shown in FIG. 3B, where the highest level of the hierarchical grid (level 0) has the largest (and therefore the coarsest) grid-cell size. In this structure, level 0 corresponds to a 1×1 grid where the sole grid-cell has a size that is the entirety of the layout. At the next level (level 1) an initial expansion parameter set to 3×2 produces a 3×2 grid, where each individual grid-cell has the same size as all other grid-cells on the same level.

At the next level (level 2), an incremental expansion parameter set to 3 produces a 9×6 grid at this level. As before, each individual grid-cell has the same size as all other grid-cells on the same level.

This hierarchy of grids continues until a termination criterion is reached, at which point the physical grids have achieved their smallest (and finest) level of granularity. In one embodiment of the invention, the termination criterion may associate the number of levels in the grid to the number of objects stored in the grid. In another embodiment, grid expansion may terminate when the grid-cell dimension at the lowest level is smaller than a specified threshold. For example, in the present figure, it is assumed that level 3 is the lowest level of the hierarchical grid, where the expansion parameter of 3 results in a 27×18 grid on level 3. In yet another embodiment, grid expansion may terminate when the number of objects that would be stored in lower-level grids is smaller than a specified threshold. Other termination criteria may be used in other embodiments. Still other embodiments may use different techniques to determine the number of grid levels and the size of the grid-cells at each level, wherein those techniques may not involve the use of an expansion parameter or a termination criteria.

Returning back to FIG. 3A, the next step at 304 is to determine the size of the objects being tracked by the hierarchical grid. This action is taken because the size of the object will determine, at 306, the specific level of the hierarchical grid to which that object will be assigned.

Essentially, the hierarchical grid acts like a sieve, in which an object having a size that is larger than then grid size will be allocated to that grid level, but smaller objects will fall to the lower levels until they reach the specific level appropriate for the size of that object.

This process is illustrated in FIG. 3C. In this figure, there are four objects A, B, C, and D to be managed by the hierarchical grid. The hierarchical grid includes three levels at depth 0, depth 1, and depth 2 respectively. A is the largest object, followed by B, with the smallest objects being C and D.

In this example, A is large enough such that it is too large to pass through from depth 0 to depth 1. Therefore, A will be associated with the grid at depth 0 and is assigned to the single grid-cell at level 0.

Object B is small enough such that it can pass through depth 0 to depth 1. However, it is too large to pass through from depth 1 to depth 2. Therefore, B will be tracked by one of the containers in the hierarchical grid of depth 1. In this example, it can be seen that B entirely falls within the boundary of the lower right grid 360 at depth 1. Therefore, B will be associated with that grid-cell 360.

Object C is small enough such that it can pass through both depth 0 and depth 1 to depth 2. Therefore, C will be tracked by one of the containers in the hierarchical grid of depth 2. In this example, it can be seen that C entirely falls within the boundary of the lower left grid 362 at depth 2. Therefore, C will be associated with that grid 362.

Object D is much like Object C in that it is small enough such that it can pass through both depth 0 and depth 1 all the way to depth 2. Therefore, D will be tracked by one of the containers in the hierarchical grid of depth 2. However, unlike object C, object D does not fall entirely within the boundaries of a single grid. Instead, it can be seen that D overlaps across the boundaries of multiple grids at depth 2.

According to one embodiment, objects are assigned to a container based upon the lower left corner of that object. In this example, the lower left corner of object D is located in grid-cell 330. Therefore, object D will be associated with that grid 330.

At the end of this process, every object being tracked by the hierarchical grid will become assigned to one of the grid-cells in the hierarchy, where the assignment is based upon the size and location of that object.

As would be clear to one of skill in the art, it is quite possible that some portions of the layout include significantly more objects than other portions of the layout. Therefore, it is also possible that since the grid-cells are equal in size, some grid-cells may contain significantly more objects than other grid-cells.

This lack of balance between the contents of the grid-cells may create performance problems since the grid-cells having more objects will require correspondingly greater resource and expense to query for objects within that grid.

According to some embodiments, the solution to this problem is to further partition the denser grid-cells. According to some embodiments, this is accomplished by creating additional logical partitions within a fixed-sized grid-cell to further sub-divide the contents of the grid-cell. The partitioning scheme may be based upon any suitable partitioning criteria. For example, the partitioning scheme may be based upon the location of the objects within the grid-cell. As another example, the partitioning may be based upon other attributes of the objects in the grid-cell, such as the size of the objects.

The further partitioning may result in non-regular sized partitioning within the grid-cell. Alternatively, the same process described above may be used to create fixed sized equal sub-partitioning within the grid-cells.

Figure 4A:
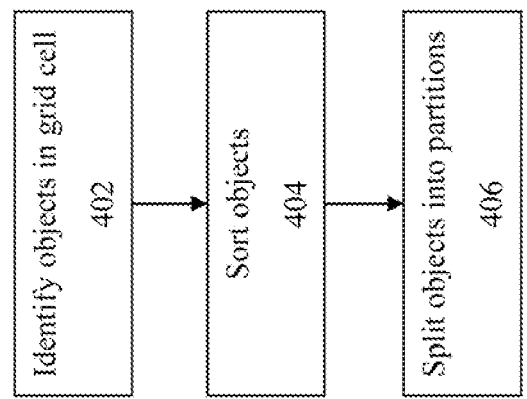
FIG. 4A is a flowchart of a process for sub-partitioning a hierarchical grid according to one embodiment of the invention.

FIG. 4A shows a flowchart of a process for performing action 204 of FIG. 2 for logically partitioning a grid-cell according to some embodiments of the invention. At 402, the objects within the grid-cell are identified.

Next, at 404, the identified objects are sorted. According to one embodiment, if the objects are being partitioned based upon object location, then the objects are sorted by either the x or y coordinates of the upper-right point. The choice can be dictated by the preferred direction for objects represented on this particular grid. For objects on a layer with a preferred direction of horizontal (vertical), the sort criterion is the Y (X) coordinate. For objects that are not layer purpose pair based (LPP-based) or for cases where it does not make sense to use a preferred direction (row objects that represent a row of placement locations for standard cell instances, for example), objects are partitioned along the Y direction. The term "LPP" refers to the concept of a Layer Purpose Pair, which formalizes the notion that a shape in a modern design may have an associated "layer" and "purpose". The layer usually corresponds to a physical layer in the design or a mask layer, such as M1, Metal 1, etc. The purpose is a user-definable specification that provides a way to identify or distinguish the shape(s) by its use in the design. For example, a designer may wish to identify or distinguish fill, power, ground, clock, and signal lines in the design, and to have these different LPPs be drawn or displayed in a layout editor with different colors or other visibly distinguishable patterns. This ability is facilitated by providing the different layers with different purposes, as layer purpose pairs. Inside the design database, the LPP is used as a way to organize the shapes in the design. This organization of LPPs allows the system to query and traverse the database of shapes by combinations of the layer and/or purpose data.

At 406, the objects are divided into multiple partitions that limit the number of elements in each partition to a manageable size. The division of the objects into partitions is based upon the selected partitioning criteria. If the partitioning criteria are based upon object location, then the sorted vector is split into element partitions based upon the locality of the objects.

Figure 4B:
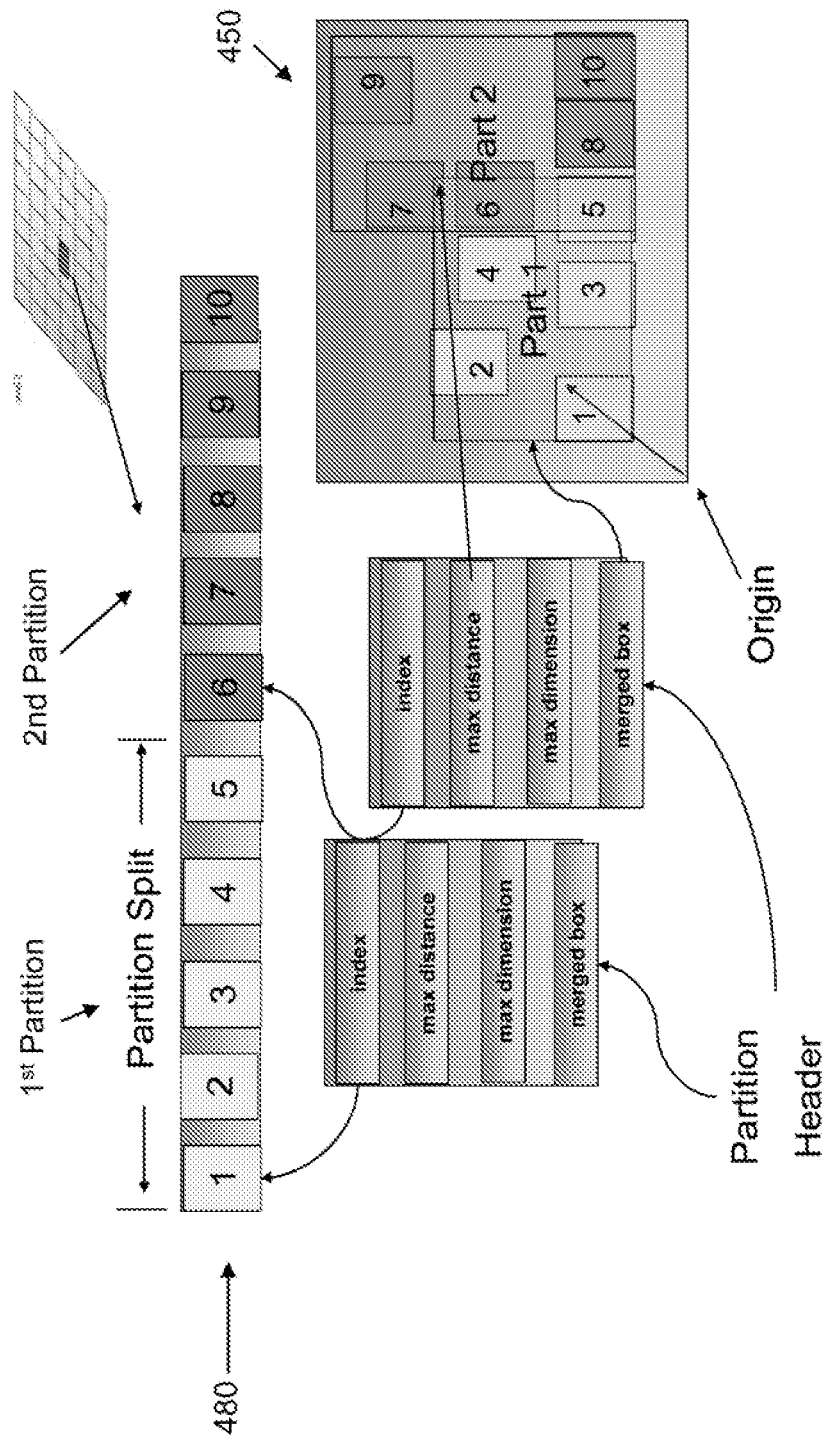
FIG. 4B illustrates a hierarchical grid being sub-partitioned according to one embodiment of the invention.

To illustrate this process, consider the grid-cell 450 shown in FIG. 4B. Pursuant to 402, identification is first made of the objects in this grid-cell, which are objects 1-10.

The identified objects are then sorted based upon sorting criteria that corresponds to the partitioning criteria. For this example, assume that the partitioning criteria are location-based, calculated based upon the distance from the lower left corner of the container ("Origin" of the grid-cell) to the upper-right point of each object. Under this sorting criterion, the object 1 is the closest object to the origin, followed by object 2, object 3, etc.

Vector 480 provides a structure for tracking the sorted ordering of the objects 1-10, in which each object is placed into a slot in vector 480 based upon its distance from the origin, with the closest object at the front and the farthest object are the rear.

Thereafter, a partition split is performed by selecting a given number of the objects for each partition. In this example, each set of five objects would be assigned to the same partition. Therefore, objects 1-5 would be assigned to a first partition and objects 6-10 would be assigned to a second partition.

Auxiliary information is maintained in a partition header for each element partition. This information allows one to treat the partitioned vector as a skip list. Partitions that do not meet the search criterion are skipped en masse; partitions that meet the search criterion undergo a detailed analysis of the elements within the partition to determine matching elements.

In the present example, the partition header includes index information, maximum distance information, maximum dimension information, and merged box information. The index information provides the offset within vector 480 for the first element in a given partition. The maximum distance information identifies the maximum distance from origin for the objects in the partition.

The maximum dimension information identifies the largest dimension for the objects in the partition. The purpose for this information is to allow filtering based upon size of objects. For example, consider a layout editor tool that allows the layout to be viewed at different levels of magnification. Under certain levels of magnification, objects of a given size (or smaller) will be too small to be displayable because of the pixel resolution of the display device for the layout editor. Under this circumstance, the partitions that do not have any objects meeting a minimum viewable size can therefore be pruned from any queries. The maximum dimension information maintained for the partitions allows such pruning to occur.

The merged box information identifies a box formed by the combined outer boundaries of the objects within a partition. This information is useful when determining whether to prune a partition from a search query that is based upon location, e.g., if the bounding box of a search box does not overlap with the merged box for a partition, then that partition can be pruned from query considerations.

FIG. 5 shows a flowchart of a process for performing queries using the hierarchical grid structures according to some embodiments of the invention. At 502, grid-cell(s) are identified which intersect with a search region. To accomplish this, the bounding box corresponding to the search region is reviewed against the hierarchical grid at every level to see which of the grid-cells overlap or intersect with the bounding box.

Next, at 504, the search region is expanded to include additional grid-cells which may include objects that overlap the bounding box. To explain, consider the bounding box 730 in FIG. 6A for a search region which appears to only overlap or intersect with grid-cell 714 of a given level in hierarchical grid 700. In this case, grid-cell 714 would be pertinent to any query processing involving bounding box 730.

Figure 6B:
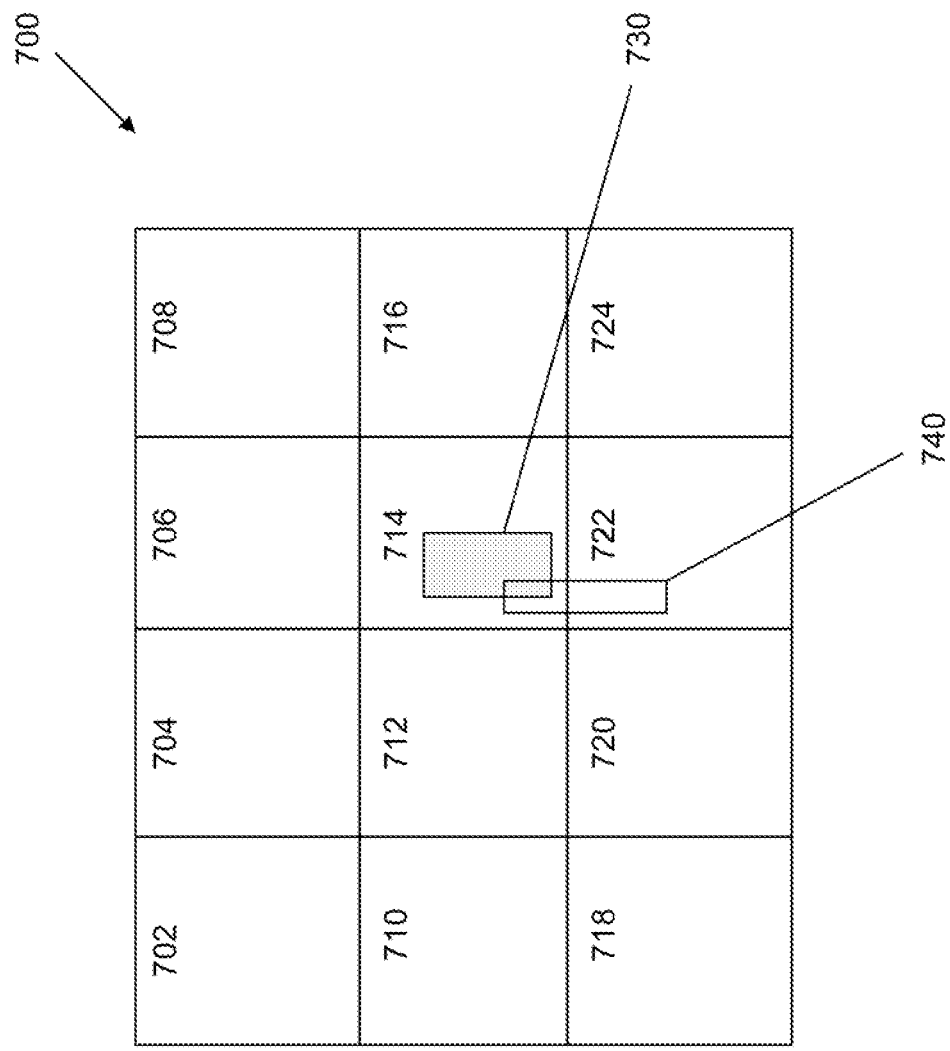

However, as noted above, the criteria for associating an object to a given grid-cell in some embodiments is based upon a single location on that object. Under this type of an approach, it is possible that the object itself may have boundaries or dimensions that go across grid-cell boundaries. In particular, it is very possible that an object that is associated with a first grid-cell will nonetheless have dimensions that will cause it to overlap a grid-cell boundary such that it may fall within a search region having a bounding box that is wholly within another grid-cell. As an illustration of this, consider again the bounding box 730 that is wholly within grid-cell 714. As can be seen in FIG. 6B, it is possible that an object 740 which is assigned to a different grid-cell 722 has dimensions that cause this object to fall within the boundaries of bounding box 730.

To address this issue, the search region will be expanded beyond just the one or more grid-cells which directly overlap or intersect the bounding box. In the case where the lower left corner of an object is used for assigning the object to a grid-cell, then the search region can be expanded by including the grid-cells to the left and below the originally selected grid-cells. In the present example, this means that in addition to grid 714, grids 712, 720, and 722 would be identified as additional grid-cells for the expanded search region.

Figure 7:
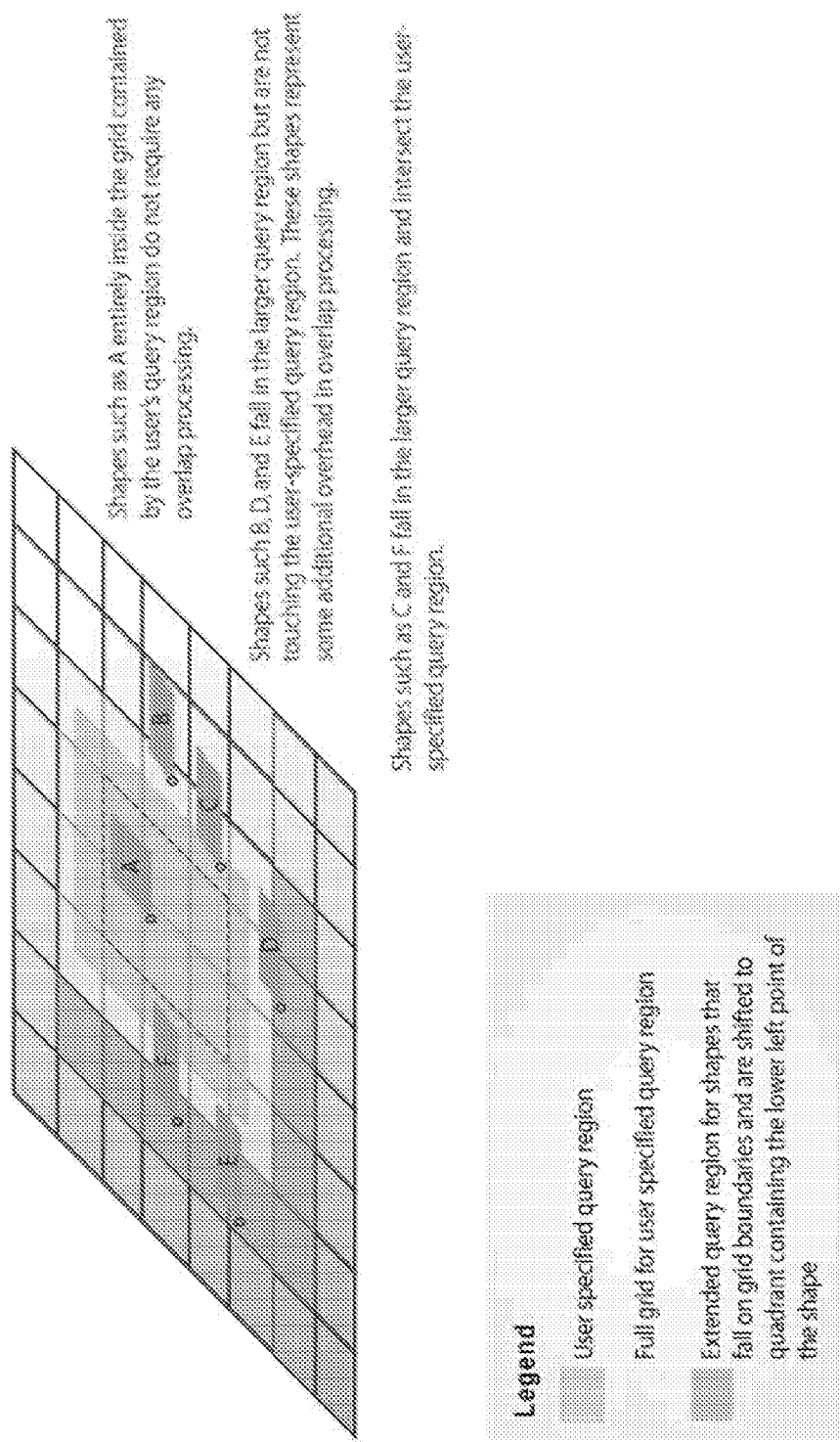

FIG. 7 provides a more comprehensive illustrative example of this expansion action. This example shows shapes A, B, C, D, E, and F. Shape A is in a grid-cell entirely contained by a query region, and is therefore does not require any overlap processing. All objects stored in the grid-cell containing A must be returned as part of the query.

Shapes B, D, and E are within the grid-cell containing the search region, but do not themselves fall within the search region. Therefore, additional overlap processing may be needed to handle these shapes because they may not overlap the search region. As described in more detail below, it is possible that such shapes can be pruned from consideration based upon pruning of logical partitions within the grid-cells that may potentially contain some shapes that would overlap the search region, where improved efficiency is obtained since each individual shapes will not have to be separately analyzed since the analysis will be performed at the level of the logical partition.

Shapes C and F fall within the expanded search region and intersect the user-specified query region. In this case, by expanding the search region, it becomes possible to identify these objects are being relevant to the query.

Returning back to FIG. 5, the next action is to see if it is possible to prune some or all of the search space. The reason for this is that it is highly likely there will be objects or regions within a matching grid-cell that are not relevant or necessary to process a query, e.g., will not match the search criteria or predicates for the query. For example; if the application is a layout editor and objects must meet a minimum size requirement to be relevant for viewing, then any partitions which do not have objects meeting that minimum size can be pruned; similarly, if the search region does not intersect or overlap with a partition in a grid, then that partition can be pruned. It is noted that while this example specifically refers to pruning of partitions based upon these specified criteria of object size and bounding box, pruning may be implemented based upon any suitable pruning criteria for any type of container. For example, a whole grid, a specific depth, a grid-cell, or partitions could be pruned. For each container, key information can be maintained for the pruning criteria, e.g., bounding box and maximum dimension information.

Figure 8:
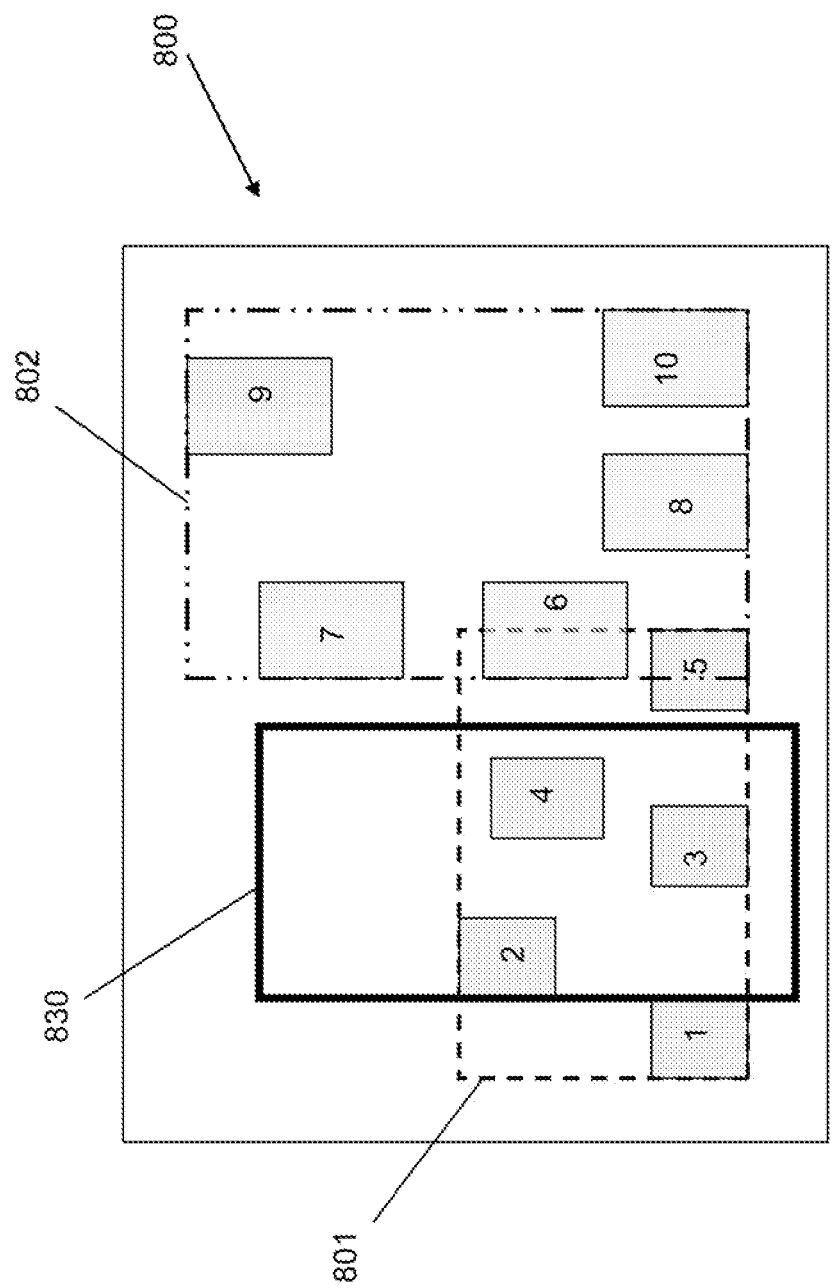

To illustrate, consider the grid-cell 800 in FIG. 8 that includes partitions 801 and 802. In this example, it can be seen that the bounding box 830 for the search region for the query does not overlap or intersect with partition 802. Therefore, partition 802 can be pruned from the query.

At 508, the relevant partitions can then be searched for objects that meet the query predicates. In the example of FIG. 8, it can be seen that searching partition 801, objects 2, 3, and 4 fall within the boundaries of box 803. Therefore, assuming these objects meet the minimum size requirements, they will be returned at 510 to be displayed to the user on a display device or stored as part of a data result set into a computer storage medium.

There are numerous optimizations that may be applied to this query process. One optimization is to start from the depth where the grid-cells are larger than or equal to the filter size. This eliminates the cost of searching lower depths for larger queries where the filter size is greater than the maximum dimension of objects placed at that level.

Another possible optimization is to recognize the grid-cells that are wholly contained within the grid-region. Overlap checks might be skipped on grid-cells that are wholly contained within the query region. Yet another possible optimization is to detect if the minimum dimension stored on the grid-cell is greater than the filter size. Dimension checking can be skipped on such grid-cells since all the objects have a dimension greater than the specified filter size.

Some embodiments of the invention can be implemented in a controllable and configurable manner, using a heuristic or an optimization algorithm to optimize the characteristics of the hierarchical grid structure for a particular objective or set of objectives. The basis for this is that the hierarchical grid partitioning strategy allows the topology of the grid to be pre-determined before objects are placed on the grid. The heuristic or optimization algorithm may be used to determine the depth and granularity of space partitioning.

The granularity of the grids should be selected to allow, if possible, a fairly even spread of objects across the different levels in the hierarchical grids. This can be accomplished in any appropriate manner. For example, one possible approach that can be taken is to build a histogram to track the distribution of the object sizes in the layout. The histogram can be examined to identify the grid size for each level of the hierarchic grid that would allow a suitably even distribution of objects. The number of levels in the hierarchical grid can be selected based upon the number of objects in the layout and upon the size differences and distributions for the objects. Of course, the greater the number of levels, the greater the costs to maintain the data structures, and hence the potential benefits of an increased number of levels should be balanced against the costs to select the appropriate number levels in the hierarchical grid.

In addition to the number of levels in the hierarchical grid, the histogram can be used for other purposes. For example, the histogram can be examined to determine the optimum incremental expansion parameters, for varying the sizes of the grid-cells at different levels of the grid.

Similarly, the number of objects in each logical partition within a grid-cell is subject to optimizations. The larger the logical partition size, the greater the chance that intersects will occur, and the less chance that a particular partition will be pruned from a query. However, smaller partition sizes usually means that more logical partitions will need to be created and maintained, resulting in greater systems costs that must be incurred. Therefore, the benefits should be analyzed relative to the costs to select the appropriate logical partition size. According to one embodiment, the number of objects for each logical partition is set at or around fifty objects.

The determination of the characteristics of the hierarchical grid may be fixed or adaptive. A fixed strategy may use an initial partition, expansion factors and a termination criterion to define a progression of grid level characteristics, or may simply define the number of grid levels and their characteristics directly. An adaptive strategy uses information about the characteristics of the design, such as the distribution of object dimensions, to determine the number of grid levels and their characteristics. Some embodiments may use an adaptive strategy to generate a grid granularity progression that balances the number of objects placed at each level. For both strategies, if the preferred routing direction is available, the progression can be tuned to bias the partitioning along either the X or Y directions. This makes sense for hierarchical grids that organize shapes and LPP-based objects where a preferred routing direction is available. For other hierarchical grids, the progression is not biased in any direction.

This document will now describe some maintenance procedures with respect to the hierarchical grid structures. According to some embodiments, the maintenance of the hierarchical grid structures associated with changes to the layout, such as adding or deleting an object, is not performed immediately, but instead may be deferred until a later time period. This is because it can be expensive to re-build the grid and partition structures each and every time a modification occurs to the layout, particularly if the specific structures that need to be modified based upon the change to the layout are not immediately needed for any immediate queries.

Therefore; according to some embodiments, such re-builds of the structures will be deferred until a later point in time, allowing multiple changes to be handled together at the same time. The time period to perform these maintenance tasks can be triggered based upon some event, e.g., a request or query that relies upon an object, structure, or set of data that is no longer valid in light of past modifications to the layout. Alternatively, the time period can be based upon some set period of time, e.g., two hours, or every day at midnight, or even based upon detection of low system activities or periods of low system usage.

According to one specific embodiment, evaluation of deferred updates occurs on demand, when requested by the application. If an application chooses to trigger these updates on a periodic basis, this can also be implemented consistent with embodiments of the invention.

Figure 15:
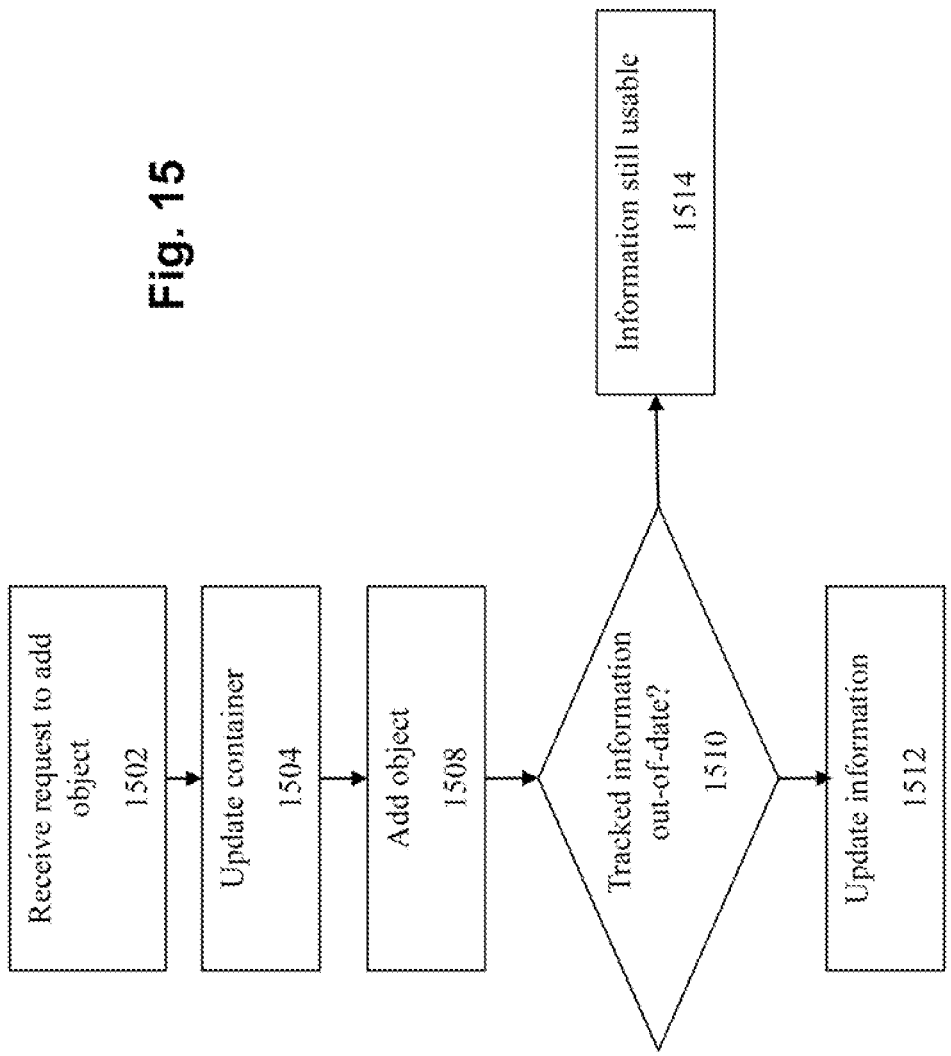
FIG. 15 shows a flowchart of an approach for adding an object.

FIG. 15 presents a flow of an approach for adding objects to a grid-cell according to some embodiments. At 1502, a request is received to add an object to a grid-cell. Because the corresponding modifications to the grid-cell structures of FIG. 4B will not occur immediately, the present embodiment provides an approach for tracking the added object up until the time at which re-compilation of the structures of FIG. 4B will occur. Therefore, at 1504, the grid-cell that includes the added object is updated. The grid-cell may be marked to indicate that a change has occurred, where the mark on the grid-cell indicates that objects have been added to the grid-cell since it was last rebuilt.

The key point to be made here is that addition of objects in a grid does not invalidate the various containers in the grid. The mark is only used to indicate the possible addition of one or more objects, and not to invalidate the containers in the grid. This is different from the deletion scenario, which has the potential to invalidate containers (as described in more detail below). Therefore, according to some embodiments, this mark on the grid-cell is specific to additions, and isn't used for removals.

Figure 16:
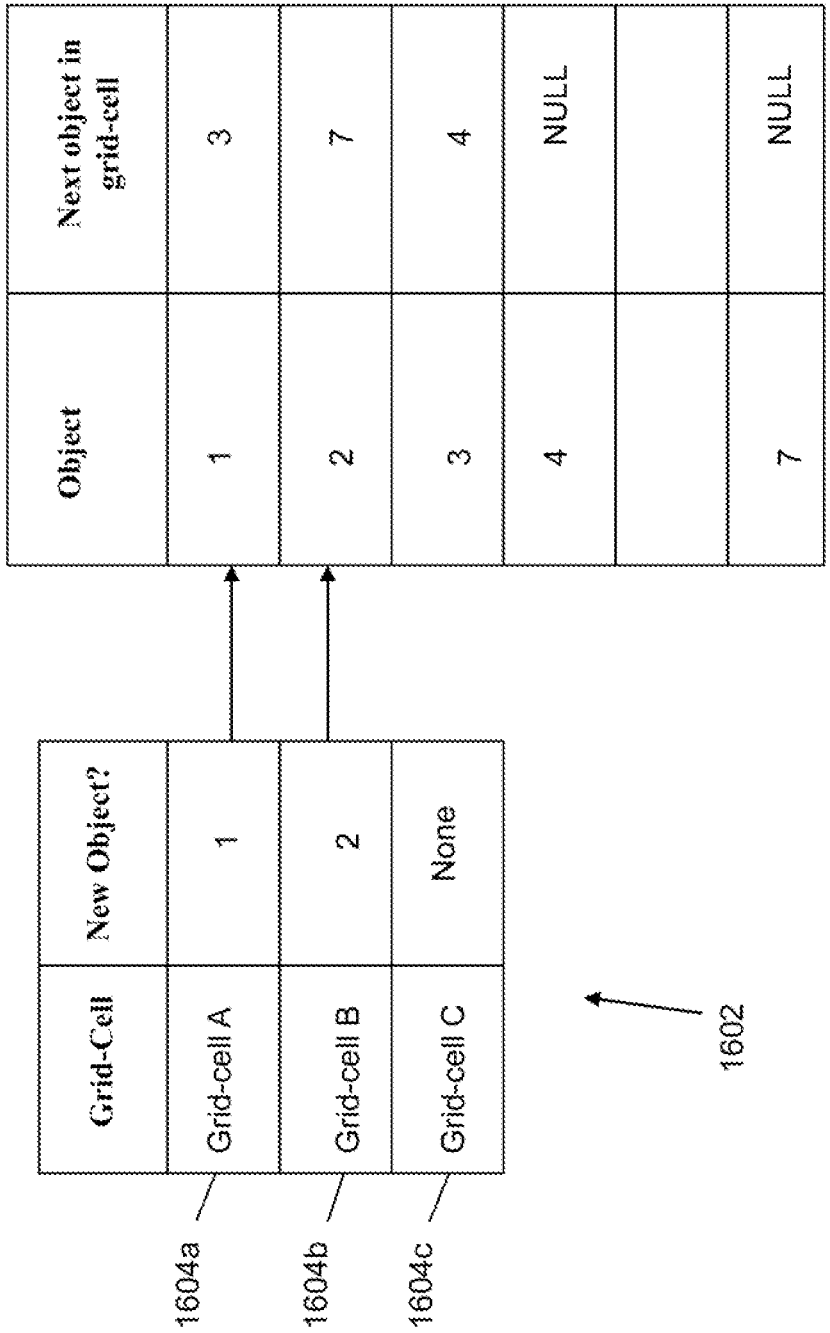
FIG. 16 shows example structures for tracking added objects.

At 1508, the object itself is placed into a storage structure so that it can be located when a query is made against the grid-cell. FIG. 16 illustrates an example approach that can be taken to track objects added to a grid-cell. This figure shows a structure 1602 that can be marked to indicate that a given grid-cell has been modified to include an added object. Structure 1602 includes one or more slots, where each slot corresponds to a grid-cell. For example, slot 1604a corresponds to grid-cell A, slot 1604b corresponds to grid-cell B, and slot 1604c corresponds to grid-cell C. When an object is added to a grid-cell, the slot for that grid-cell is marked to indicate that the grid-cell now includes an added object.

Another structure 1610 is shown as an example of a type of structure that can be used to store the newly added objects. The structure 1610 includes locations to store each object. In addition, each object will point to the next object in structure 1610 that is associated with the same grid-cell. If structure 1610 does not have any free locations, additional space can be created by increasing the amount of memory allocated to the structure.

When an object is added to a grid-cell for the first time, the new object is added to a free location in structure 1610. The slot corresponding to the changed grid-cell in structure 1602 is marked to indicate that the grid-cell has been updated, and the slot will also be modified to include a pointer to the specific location in structure 1610 that includes the new object. However, the "next object in grid cell" column for the new object will not point to any other entries in structure 1610, since at this point there are no other new objects for the same grid-cell.

If any additional objects are added to the grid-cell, then the new object is placed into a free location in structure 1610. The row corresponding to the previously added object would then have its value in the "next object in grid cell" column modified to point to the new location. Each time a new object is added, this process is repeated to create a linked list of the new objects.

For example, FIG. 16 shows slot 1604a corresponding to grid-cell A. This slot 1604a points to the address for object 1 in structure 1610. This means that grid-cell A has at least one new object, and that object 1 is the earliest added object of the set of new objects for grid-cell A. The entry for object 1 in structure 1610 points to the address for object 3 in structure 1610. This means that object 3 is also associated with grid-cell A. The entry for object 3 similarly points to the address for object 4 in structure 1610. This means that object 4 is also associated with grid-cell A. Object 4 does not point to any other objects in structure 1610. This means that there are no further "new" objects associated with grid-cell A. Therefore, objects 1, 3, and 4 are the new objects that have been added to grid-cell A.

When a query is made against grid-cell A, the structure 1602 is checked to see if there are any additional objects that need to be reviewed. In this case, slot 1604a in structure 1602 indicates that the grid-cell A does indeed have new objects, and therefore, the query should proceed to object 1 in structure 1610 to access the newly added objects. The linked list of objects in structure 1610 is thereafter followed to check the new objects 1, 3, and 4 for grid-cell A to process the query. It is possible that the newly added object will require an update of some item of tracked information for the grid-cell. As shown in FIG. 4B, the "max dimension" and "merged box" are examples of information items that may be tracked for each logical partition of a grid-cell. Adding a new object may change or require an update for these types of information for the logical partitions of the grid-cell. In addition, the newly added object cause changes to ripple up through several levels of the design/container hierarchy. For example, since the bounding box and the maximum dimension of the new object are known, these items of tracking information can be immediately updated for the grid, grid-level and grid-cell containers in the design containing the new object, based upon the characteristics of the new object. These items of tracking information can be immediately updated for affected grid, grid-level, and grid-cell containers in higher designs.

However, it may be unclear which partition will correspond to the new object, since this determination will involve a re-sorting of the elements that are stored on the grid-cell. As noted above, this re-sorting process will be deferred until a later point in time. Until the re-sorting occurs to re-build the grid and partition structures, the marks on the grid-cell will serve to inform the application of the new object additions.

Returning back to FIG. 15, the process at 1510 checks whether the newly added object will cause any of the tracked information to become out-of-date for any respective levels of the design/container hierarchy, e.g., for the grid, grid-level, and/or grid-cell containers associated with the design containing the newly added object, as well as affected grid, grid-level, and/or grid-cell containers in higher level designs. If so, then at 1512, the tracked data will be updated. Otherwise, at 1514, the existing tracked data can still be used.

To explain, consider the examples shown in FIGS. 17A, 17B, and 17B. In FIG. 17A, an object 1702 is added which sits within the boundaries of a bounding box (merged box) for the objects in a grid-cell. Since the new object 1702 does not change the boundaries of the bounding box for the grid-cell, and has smaller dimensions than the existing dimensions of existing objects for the grid-cell, the existing items of data relating to max dimension and merged box for the grid-cell are still usable.

In FIG. 17B, new object 1704 overlaps the boundaries of the bounding box for the merged box of the grid-cell. Therefore, in this example, at least the "merged box" information for the grid-cell will need to be updated to reflect the changed information.

Figure 17C:
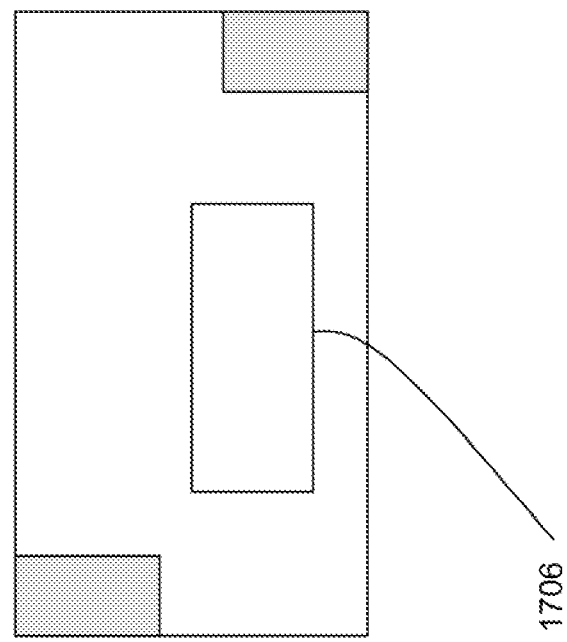

In FIG. 17C, new object 1706 has dimensions that are larger than the dimensions of existing objects in the grid-cell. Therefore, at least the "max dimension" information will need to be updated.

Deletion may occur to remove objects from the electronic design layout. Under this circumstance, it is possible that the object being removed will cause an invalidation of a structure such as the partition, grid-cell, grid-level, and/or grid. This is different from the situation when an object is added, since when an object is added, tracked information can be immediately updated for the grid, grid-level and grid-cell. Deletion however may invalidate the partition, grid-cell, grid-level and grid. According to some embodiments, invalidation occurs if the object being removed shares an edge with the partition bounding box or has the same maximum dimension as the partition. Under this circumstance, the invalidation bubbles up the hierarchy of grid containers (e.g., partition, grid-cell, grid-level and grid). In addition, if the object being removed happens to share an edge with the grid as a whole, then the invalidation will propagate further up the design hierarchy.

FIG. 18 presents a flow of a process for removing objects from a grid-cell according to some embodiments. At 1802, a request is received to remove an object from a grid-cell. Because the corresponding modifications to the grid-cell structures of FIG. 4B will not occur immediately, the present embodiment provides an approach for tracking the deletion of the object up until the time at which rebuilding the structures of FIG. 4B will occur. Therefore, at 1804, the container that includes the removed object is updated to indicate that a change has occurred. If the object exists within the structure of FIG. 4B, then the structure is modified to remove the object, e.g., by placing a "hole" or placeholder in the structure in place of the object. If the object is being tracked by the structure 1610 of FIG. 16, then the object is removed from the structure 1610. Any pointers that point to the former location of object are re-pointed, e.g., to the next object for the grid-cell in structure 1610. If the deleted object was the only object for the grid-cell in the structure, then the structure 1602 is modified to indicate that there are no objects being tracked in 1610 for the grid-cell.

A determination is made at 1806 whether removal of the object will invalidate any of the information being tracked for the grid-cell. If so, then at 1808 the information is marked as being invalid. On the other hand, if the removal of the object does not invalidate the information, then the stored information (e.g., as shown in FIG. 4B) can continue to be used.

Examples of information that may be tracked include the "max dimension" and "merged box" information. FIG. 19A shows an example scenario in which removal of an object 1902 does not by itself cause these items of data to become invalidated. This is because object 1902 has dimensions that are smaller than the dimensions of the remaining objects and this object does not lie along the borders of the bounding box.

Figure 19B:
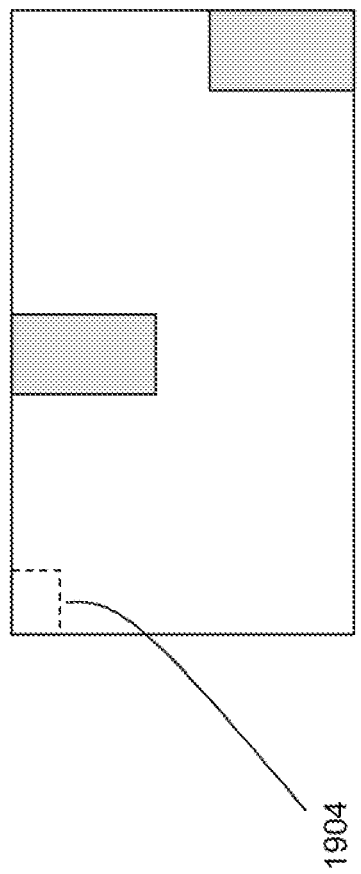

In contrast, FIGS. 19B and 19C show example scenarios in which removal of an object will invalidate some stored items of information. FIG. 19B shows an example situation in which removal of object 1904 would change the boundaries of the merged box. FIG. 19C shows a situation in which the removed object 1906 has dimensions that are larger than the dimensions of the remaining objects.

Figure 19E:
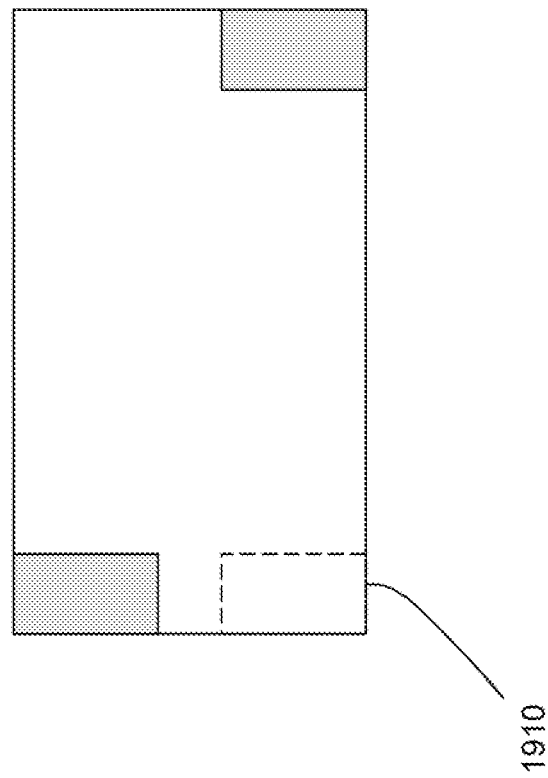

FIGS. 19D and 19E show example situations in which an object 1908 is removed which "may" cause invalidation of tracked information. In FIG. 19D, the removed object 1908 has dimensions that are identical to the maximum dimensions of the remaining objects. The issue of invalidation relates to the type of data that is being tracked. If the maximum dimension information is tracked without specifically tracking the individual objects which relate to the maximum dimensions, then the system does not know which of the objects correspond to the maximum dimension. Therefore, removing an object that matches the maximum dimension being tracked is problematic, and should cause the max dimension information to become invalid.

FIG. 19E shows the removal of object 1910, where object 1910 is one of several that shares the same edge of the merged box. In this case, the issue of invalidation relates to the merged box information that is being tracked. If the merged box information is tracked without specifically tracking all of the individual objects which relate to each edge of the merged box, then it is possible that removing an object that matches any edge would be problematic, and should cause the merged box information to become invalid.

According to some embodiments, these types of "possible" invalidations can be addressed by more precise tracking of the objects that correlate to the tracked information. For example, if the maximum dimension information is tracked along with specific tracking of the individual objects which relate to the maximum dimensions, then the system will know if there are multiple objects that correspond to the maximum dimension. Therefore, even if one object matching the maximum dimension is removed, the max dimension information being tracked remains valid. In another embodiment, rather than tracking the individual objects which relate to the maximum dimension, the system could keep track of a count of the remaining objects that relate to the maximum dimension, where each deletion of a corresponding object causes a decrement in the count. When the count reaches zero upon a deletion, invalidation would occur. Similarly, for the merged box information, each edge of the merged box can be tracked with its corresponding object(s). Alternatively, rather than tracking the individual objects which relate to each edge, the system could keep track of a count of the remaining objects that relate to each edge of the merged box.

As previously stated, the deferral approach to tracking new objects means that the invalidated information (e.g., max dimension or merged box information) may not be updated immediately. Instead, those items of invalidated information are marked as being invalid and should not be relied upon. When a subsequent query is received that needs to rely upon this information, the hierarchical grid structures can be re-built, either partially or wholly, to generate valid items of data for the invalidated information. The tracked information may also be re-computed.

Therefore, what has been described is an improved approach for managing and querying electronic design data. The present approach provides numerous advantages over prior approaches. For example, the present approach solves the capacity problems with prior approaches, since the hierarchical grids eliminate the need to store duplicate references to design objects. The present approach provides a very efficient way to prune portions of the design data from query processing, allowing a much improved run-time query performance. In some embodiments, this performance improvement is further enhanced by ensuring advantageous locality of data being accessed for the logical partitions, by storing the data in the partition vectors shown in FIG. 4B contiguously in memory. This allows very efficient access to the data, especially as compared to prior approaches where the data for partitions could possibly be spread across wide localities of data storage locations.

Unlike the prior art, the present approach also allows for a canonical way to "compute" rather than search for the specific grid/grid-cell that corresponds to an object. In prior approaches, the number of container levels is adaptable based upon the number of objects that are in a given vicinity with other objects, such that a node of a tree will be split to accommodate too many objects at that node. In this way, the "tree" structure of the prior art could have an indeterminate number of container levels, and therefore a search would need to be conducted to go through the different levels of the structure to determine the location of a particular object.

In embodiments of the invention, the number of grid levels is known. Therefore, given the known size and location of an object, it is always possible to compute the exact grid-cell that corresponds with the object, rather than searching for the correct grid-cell among many unknown levels of grid-cells. Once the correct grid-cell has been identified, only then will any searching need to take place to identify the logical partition within the grid-cell that is associated with the object.

It is noted that additional embodiments may be implemented which vary the way grid sizes are organized in the hierarchical grid. For example, while the above embodiments show the higher level grids having larger grid-cell sizes than lower level grids, this specific organization of grid sizes is not necessary. In fact, the invention can be implemented such that the higher levels have smaller grid-cell sizes than the lower levels of the hierarchy. According to some embodiments, the data can be organized in any way so long as the canonical assignment and search algorithms understand the organization.

Improved Existence Check Structure

As noted above, a system may need to create and maintain auxiliary structures that allow for efficient queries on the various physical objects that contribute to the block domain.

Figure 14A:
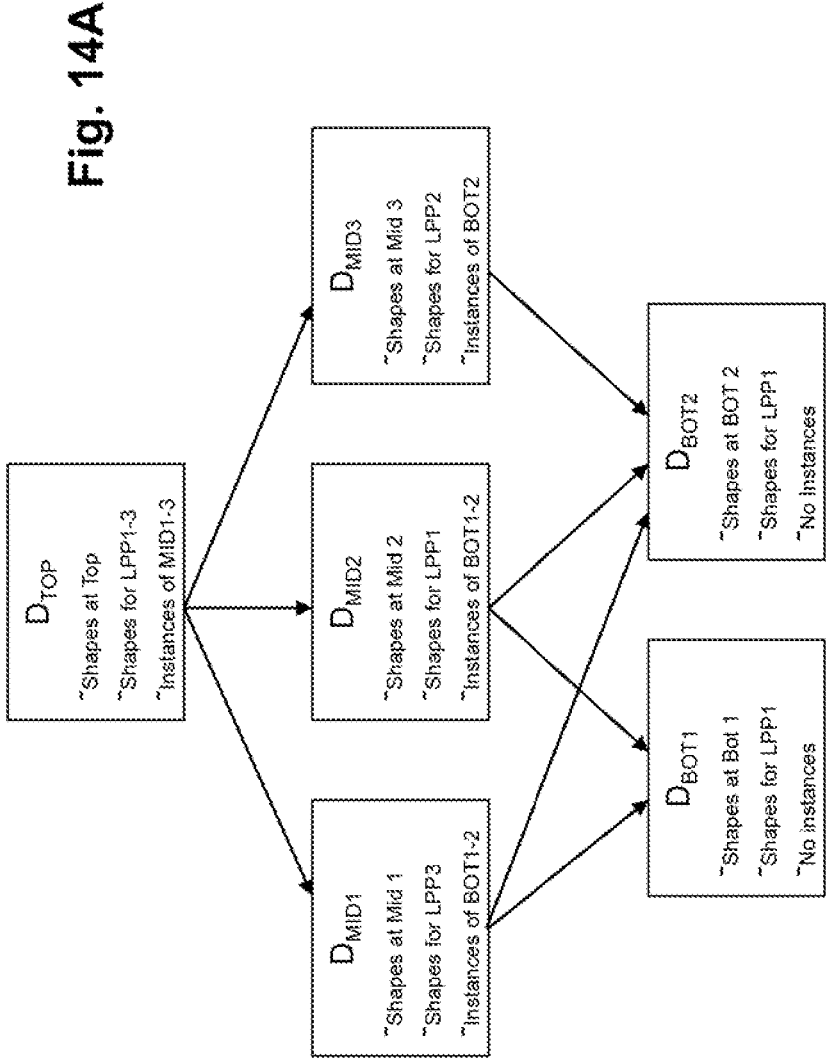
FIGS. 14A-E illustrate an example hierarchy of structures for tracking layout objects.

To explain, consider the example design hierarchy shown in FIG. 14A. A design at the top level of the hierarchy may be represented by $D_{Top}$, which include both instances (e.g., instances Mid1, Mid2, and Mid3 of designs $D_{MID1}$ through $D_{MID3}$ respectively) and shapes, where at least some of the shapes may correspond to LPPs 1, 2, and 3.

At the middle level of the hierarchy, $D_{MID1}$ represents the design corresponding to instance Mid 1, which itself includes instances (e.g., instances Bot 1 and Bot 2 of designs $D_{BOT1}$ and $D_{BOT2}$ respectively) and shapes associated with LPP3. $D_{MID2}$ represents the design corresponding to instance Mid2, which includes instances (e.g., instances of designs $D_{BOT1}$ and $D_{BOT2}$ respectively) and shapes associated with LPP1. $D_{MID3}$ represents the design corresponding to instance Mid 3, which includes instances (e.g., instance Bot 2 of design $D_{BOT2}$) and shapes associated with LPP2.

At the bottom level of the hierarchy, $D_{BOT1}$ represents the design corresponding to instance Bot 1, which does not include any instances, but does include shapes associated with LPP1. $D_{BOT2}$ represents the design corresponding to instance Bot 2, which also does not include any instances, but includes shapes associated with LPP1.

Figure 14B:
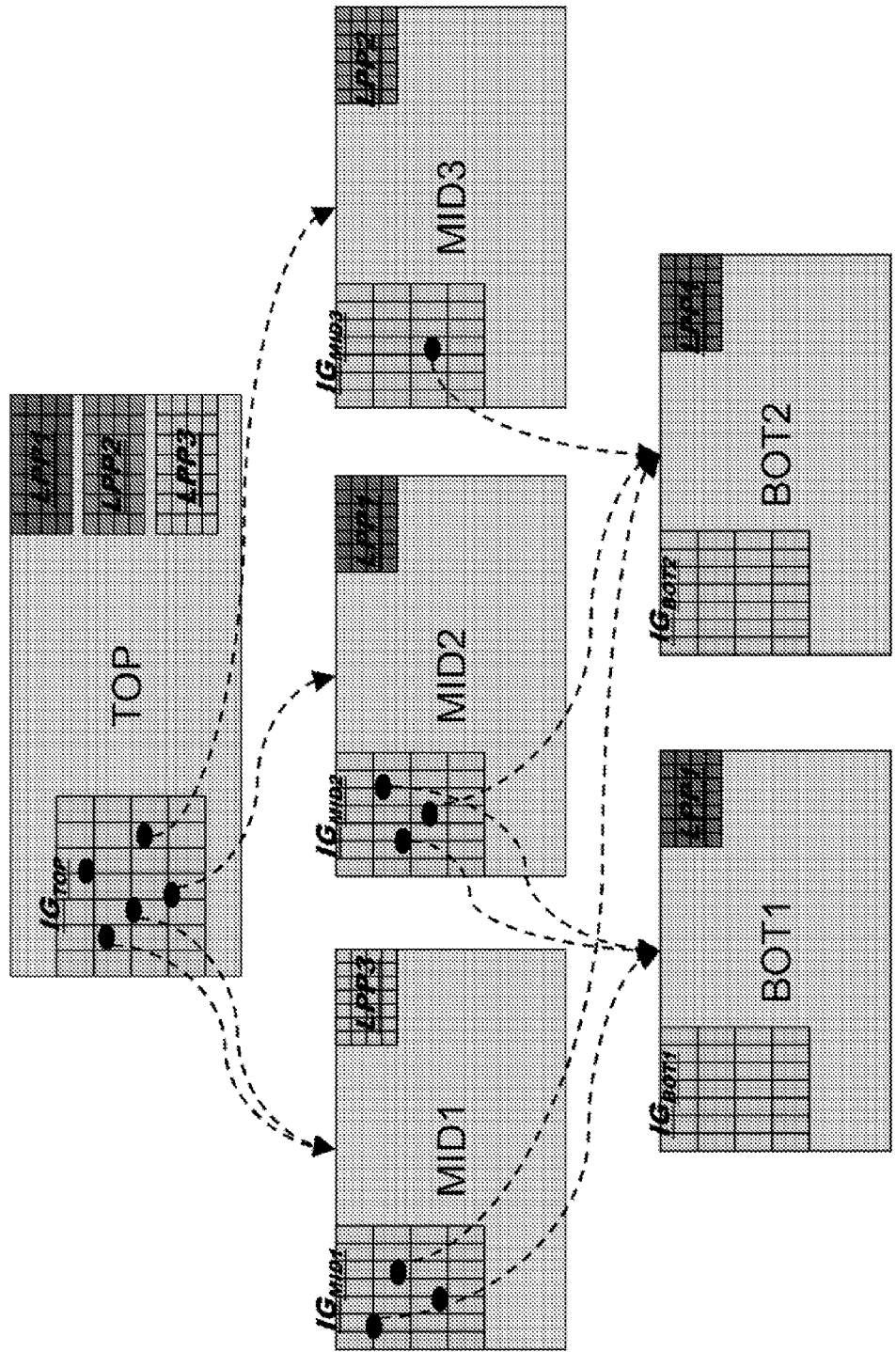

Hierarchical grid structures may be associated with this hierarchy as described above. For example, as shown in FIG. 14B, the hierarchical grid structures associated with the top level $D_{Top}$ includes an instance grid $IG_{top}$ that includes an entry for every instance within the top level (Mid1, Mid2, and Mid3). The top level of the hierarchy is also associated with grids for LPP1, LPP2, and LPP3, which identify shapes for these LPPs that exist at the top level $D_{Top}$.

The hierarchical grid structures associated with $D_{Mid1}$ will include its own instance grid $IG_{Mid1}$ that includes all instances (Bot 1 and Bot 2). Since design $D_{Mid1}$ includes shapes from LPP3, then design $D_{Mid1}$ will also be associated with a grid $GRID_{LPP3}$ for LPP3 which identifies shapes for LPP3 that exist in $D_{Mid1}$. In effect, each instance within design $D_{Mid1}$ will correspond to its own instance map and LPP grids, continuing in a similar way through each succeeding level of the hierarchy.

$D_{Mid2}$ will be associated with its own instance grid $IG_{Mid2}$ that includes all instances (Bot 1 and Bot 2) that are at that hierarchical level. This means that entries will exist for Bot 1 and Bot 2 in the instance grid $IG_{Mid2}$. Since design $D_{Mid2}$ includes shapes from LPP1, then design $D_{Mid2}$ will also be associated with a grid $GRID_{LPP1}$ for LPP1 which identifies shapes for LPP1 that exist at the level of $D_{Mid2}$. Similarly, $D_{Mid3}$ will be associated with its own instance grid $IG_{Mid3}$ that includes all instances (Bot 2) that are at that hierarchical level. This means that an entry will exist for BOT 2 in the instance grid $IG_{Mid3}$. Since design $D_{Mid3}$ includes shapes from LPP2, then design $D_{Mid3}$ will also be associated with a grid $GRID_{Lpp2}$ for LPP2 which identifies shapes for LPP2 that exist at the level of $D_{Mid3}$.

At the bottom level of the hierarchy, $D_{Bot1}$ will be associated with its own instance grid $IG_{Bot1}$ that includes all instances that are at that hierarchical level. Since Bot 1 does not have any instances, this grid will not include any instance entries. Since design $D_{Bot1}$ includes shapes from LPP1, then design $D_{Bot1}$ will also be associated with a grid $GRID_{LPP1}$ for LPP1 which identifies shapes for LPP1 that exist at the level of $D_{Bot1}$. $D_{Bot2}$ will be associated with its own instance grid $IG_{Bot2}$ that includes all instances that are at that hierarchical level. Since $D_{Bot2}$ does not have any instances, this grid will not include any instance entries. Since design $D_{Bot2}$ includes shapes from LPP1, then design $D_{Bot2}$ will also be associated with a grid $GRID_{LPP1}$ for LPP1 which identifies shapes for LPP1 that exist at the level of $D_{Bot2}$.

This progression of grids extends through each level of the design hierarchy, which serves to track the instances and LPPs through the different levels. These structures allow for very efficient query processing, since they permit large portions of the design to be pruned if irrelevant to the query. For example, assume that a search area for a query is drawn at $D_{Top}$, and the query specifically requests the display of shapes associated with LPP2. In this case, it is known that instances of $D_{Mid1}$ do not include any shapes for LPP2, and therefore instances of $D_{Mid1}$ can be pruned from the query. These structures may be used for different types of design hierarchy, including vias and contacts used to establish physical connections between different layers.

Auxiliary structures may be implemented to allow for efficient queries on the various physical objects that contribute to the block domain. One approach that can be taken is to create "shadow" structures corresponding to objects or specific object types that provide an aggregated view of the hierarchy below an instance. For example, shape shadow structures may be maintained for each LPP used in the descendent hierarchy and row shadow structures may be maintained for all the rows in the descendent hierarchy. In effect, the shadow identifies the boundaries of the objects within a descendent hierarchy so that at any particular level of the design, it is generally known whether there are any objects at lower levels of the design in a specified query region that meet the filtering criterion. U.S. Pat. No. 6,983,440, entitled "Shape Abstraction Mechanism", describes an example approach for implementing shadow structures, which is hereby incorporated by reference in its entirety.

Figure 14C:
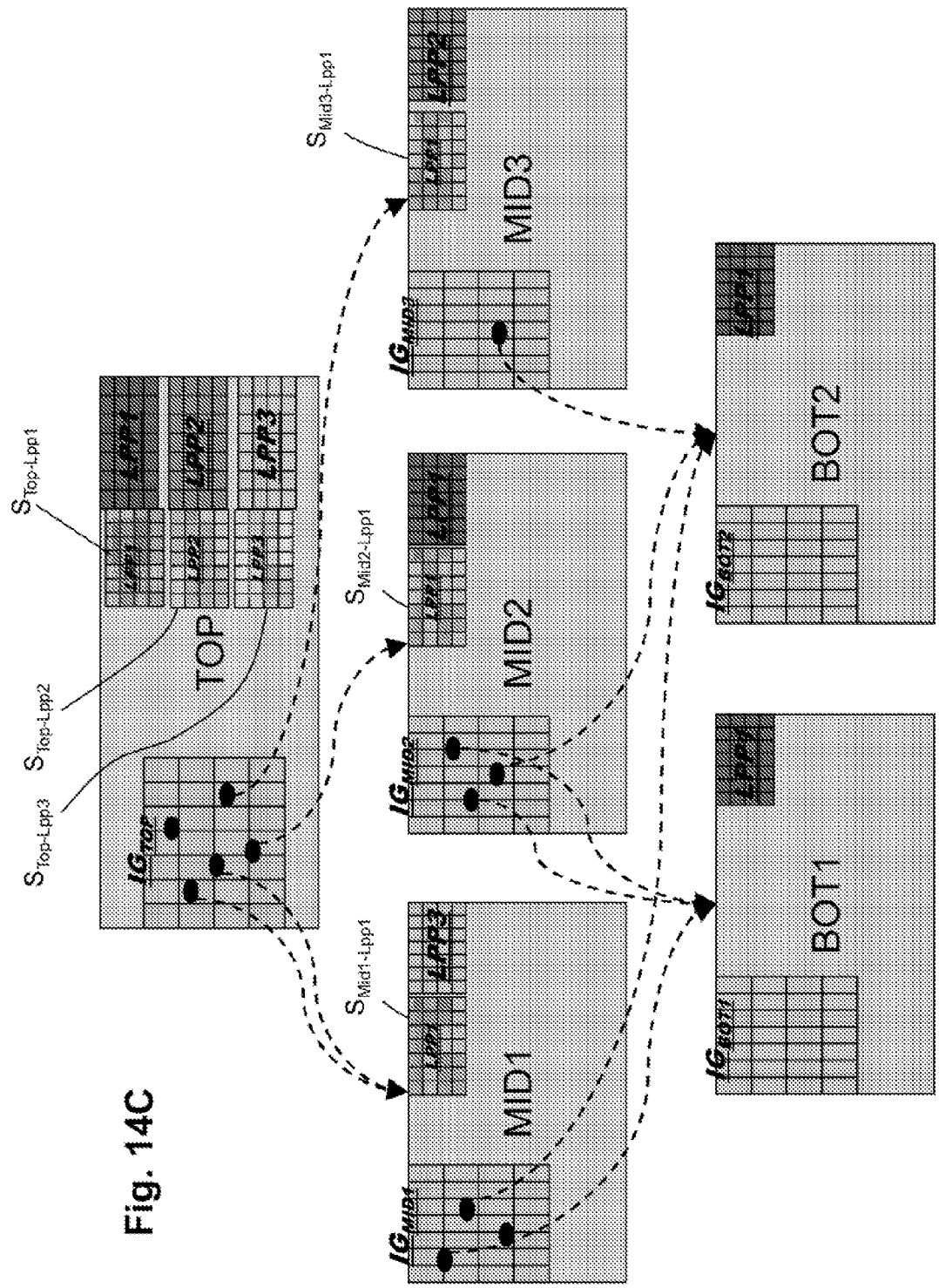

FIG. 14C shows the hierarchy of FIG. 14A with the inclusion of these shadow structures. For example, it can be seen that since the design $D_{MID1}$ corresponding to middle level instance Mid 1 includes bottom level instances Bot 1 and Bot 2, and designs $D_{BOT1}$ and $D_{BOT2}$ corresponding to both of these bottom level instances include shapes for LPP1, then a shadow can be created at $D_{MID1}$ to represent the boundaries for LPP1 in the bottom level of the design hierarchy. As shown in the figure, Shadow $S_{Mid1\text{-}LPP1}$ represents the boundaries for shapes associated with LPP1 in the descendent hierarchy below $D_{MID1}$. In a similar way, shadow $S_{Mid2\text{-}LPP1}$ represents the boundaries for shapes associated with LPP1 in the descendent hierarchy below $D_{MID2}$ and shadow $S_{Mid3\text{-}LPP1}$ represents the boundaries for shapes associated with LPP1 in the descendent hierarchy below $D_{MID3}$. At the top level, Top may implement a separate shadow structure for each of the LPPs in its descendent hierarchy. Therefore, shadow $S_{Top\text{-}LPP1}$ represents the boundaries for shapes associated with LPP1 in the descendent hierarchy below $D_{TOP}$, shadow $S_{Top\text{-}LPP2}$ represents the boundaries for shapes associated with LPP2, and shadow $S_{Top\text{-}LPP3}$ represents the boundaries for shapes associated with LPP3.

These shadow structures are quite useful and provide numerous benefits to any system that needs to query layout data. One particular benefit provided by shadows is that they facilitate existence checks, which permits the shadow-enabled system to determine whether there are any objects in the hierarchy beneath a particular level of the design corresponding to a query on a specific LPP without having to actually descend the hierarchy. Another benefit provided by shadows is with regard to space pruning, in which the shadows allow the system to know whether particular portions of the layout include objects in the descendent hierarchy—the idea being that those portions not associated with relevant objects in a descendent hierarchy can be pruned from query processing.

While useful, it is noted that creating and maintaining shadow structures could consume a significant amount of system resources. For example, under certain circumstances, the shadow structures could consume in excess of half of the overall memory footprint of the auxiliary structures required for efficient region query.

To explain the possible extent of the benefits and expense for shadow structures, consider the modern design that may include a large number of LPPs. As noted above, the layer usually corresponds to a layer in the design or a mask layer, and the purpose is a user-definable specification that provides a way to identify or distinguish the shape(s) by its use in the design. Inside the design database, the LPP is used as a way to organize the shapes in the design. This organization of LPPs allows the system to query and traverse the database of shapes by combinations of the layer and/or purpose data. The problem is that a proliferation of LPPs in a modern design also corresponds to a proliferation of resources in the form of the memory footprint needed to maintain search structures to allow efficient use of such LPPs.

Figure 9:
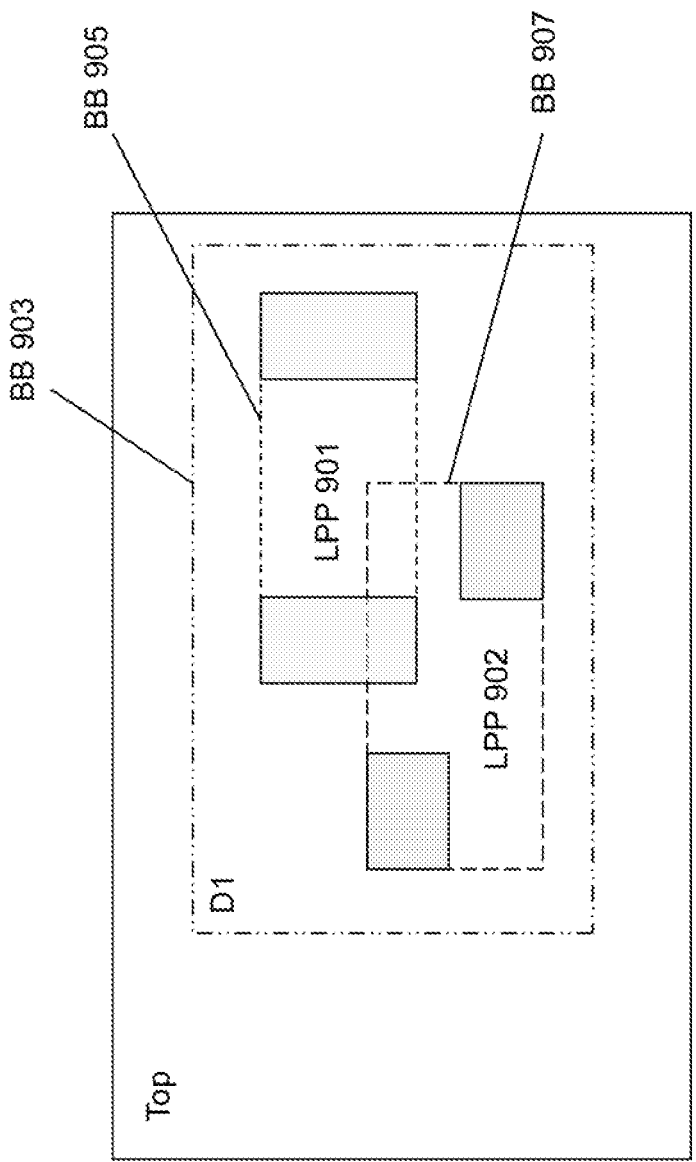
FIG. 9 shows an example design portion with bounding boxes for different shadow structures.

Consider the design "Top" shown in FIG. 9, which includes an instance I1 of a design D1. Design D1 further includes two shapes on LPPs 901 and 902 respectively. In this example, to properly maintain the shadows for this level of the design hierarchy, bounding boxes for the shadow structures for I1 corresponding to the design D1, LPP 901, and LPP 902 are created and maintained in the system. In particular, the bounding box for the instance I1 as represented in the shadow structure in TOP for LPP 901 corresponds to BB 905 and the bounding box for the instance I1 as represented in the shadow structure in TOP for LPP 902 corresponds to BB 907. As previously discussed, the possible benefits provided by these shadow structures are that the bounding boxes 903, 905, and 907 allow for existence checks (e.g., based upon a check of whether there are any objects within the boundaries of the bounding box) and space pruning (e.g., by pruning any of I1, LPP 901, or LPP 902 if the bounding boxes do not intersect or overlap with a search region).

The problem is that while shadows provide substantial benefits in terms of improved query times, the need to create the shadow structure for the design objects (e.g., for each LPP or object type) creates delays and costs during initialization. Moreover, additional costs are needed to maintain the shadow structures, e.g., during modification, deletions, and additions of shapes on LPPs. These costs exist for shadows at every level of the design, and a change at a lower hierarchical level may result in changes that need to propagate to the many shadows throughout the design. Given the trend to have increased numbers of LPPs and other design objects in a design, these costs may potentially spiral out of control and become an excessive drain on system resources.

Embodiments of the present invention provide techniques for creating and managing layout data structures which provide much or all of the benefits of shadows without the memory footprint penalty and excessive costs for performing initialization and updates. As mentioned before, shadows provide the two distinct benefits of existence checks and space pruning. The existence check aspect of shadows allows one to quickly determine if there is a need to descend through a design hierarchy while generating objects of a specific type. The space pruning aspect allows trimming of the query region to the specific area of the chip that contains the objects of interest. The present invention is based on the observation that the benefit of existence checking outweighs the benefit of space pruning. The present invention maintains the benefit of existence checking and explicitly sacrifices the benefit of space pruning, which consumes far less system resources than the shadow approach while maintaining the desirable characteristics of fast query performance. To alleviate the impact of the loss of space pruning, aggregate characteristics of the descendent hierarchy are maintained. In one embodiment of the invention, the maximum dimension of all the shapes on an LPP in the descendent hierarchy is maintained in lieu of the bounding box for each utilized LPP on each instance. This approach is space efficient because the maximum dimension information is common across all instances of a design as opposed to the per-LPP instance bounding box, which is unique for every instance.

Figure 10:
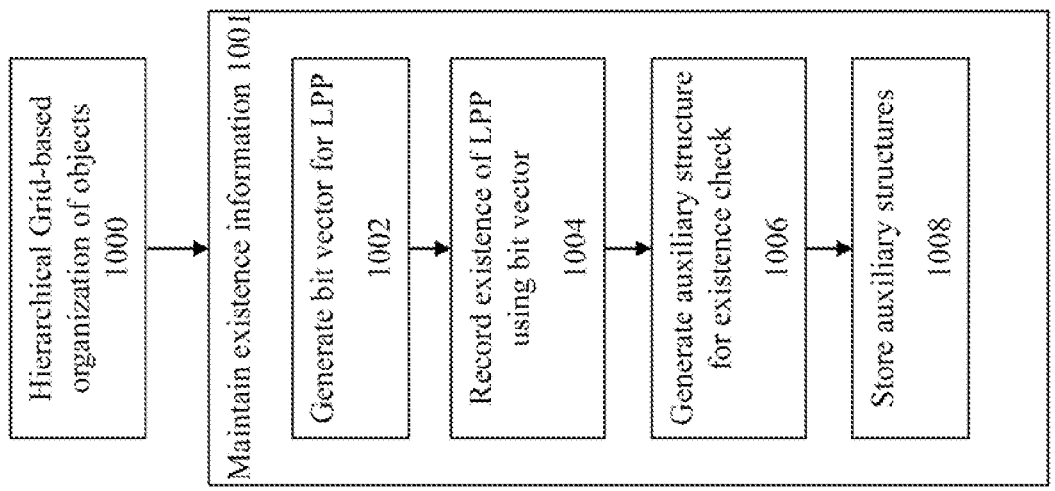
FIG. 10 shows a flowchart of a process for managing structures to perform existence checks and space pruning according to one embodiment of the invention.

FIG. 10 shows a flowchart of a process for managing layout data according to some embodiments of the invention. At 1000, the system implements a hierarchical grid-based organization of layout objects, e.g., as described earlier in this document.

At 1001, the process creates and/or maintains existence information for design objects in the layout. According to some embodiments of the invention, at 1002, existence information for design objects is maintained using one or more bit vectors where each bit in the bit vector refers to a unique LPP in the design. The bit vector is associated with every container in the hierarchical grid data structure, e.g., to a grid-cell. At 1004, the bit would be configured to have a known value (e.g., "1") if the descendent hierarchy below the instance contributes shapes on the LPP to which the bit in the bit vector is associated. The bit vector would have a known opposite value (e.g., "0") if the descendent hierarchy below the instance does not contribute shapes on the LPP to which the bit in the bit vector is associated.

Figure 11:
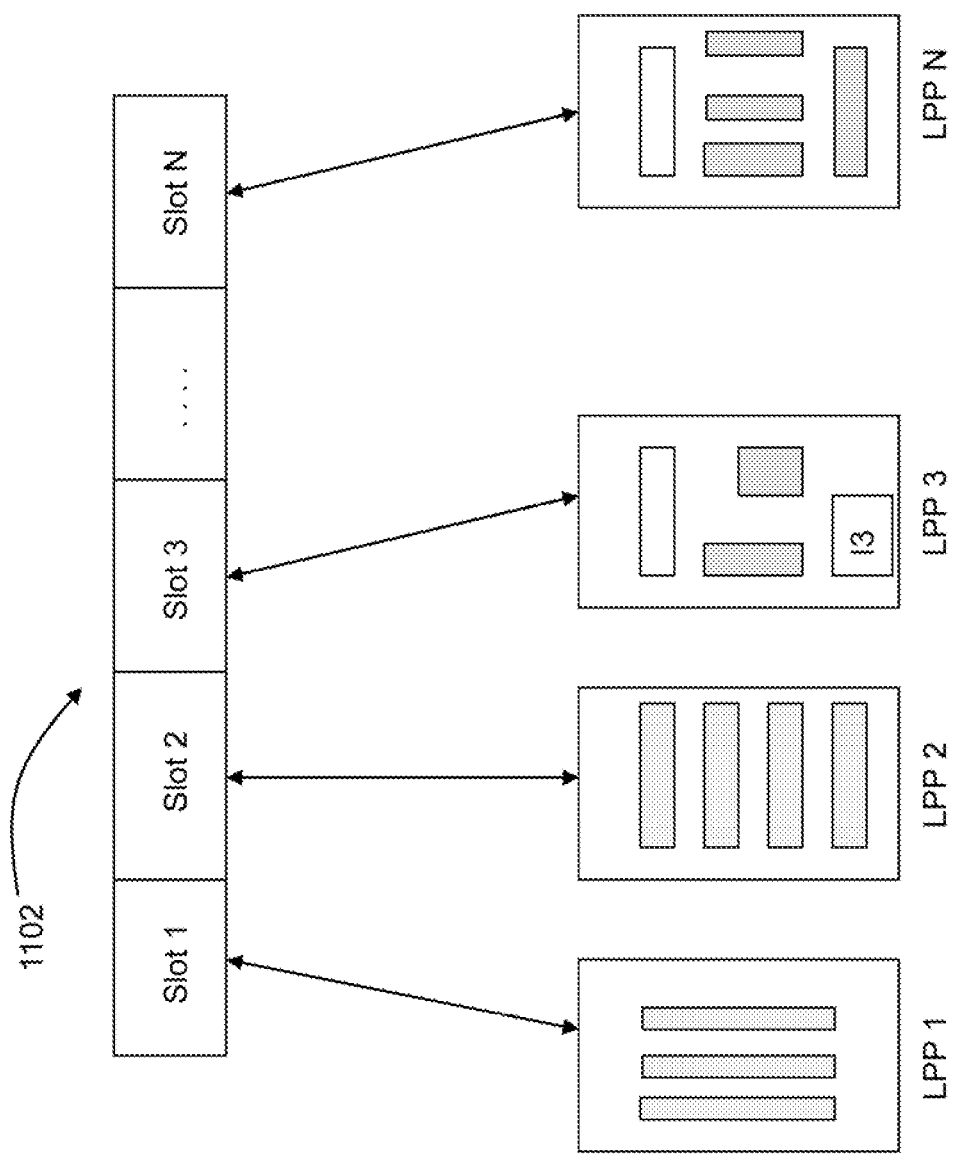
FIGS. 11 and 12 illustrate example approaches to implement structures to perform existence checks.

To illustrate, consider the bit vector 1102 shown in FIG. 11. There are N slots in bit vector 1102, with each slot corresponding to a different LPP in the design. In this example, LPP 1 is associated with slot 1, LPP 2 is associated with slot 2, LPP 3 is associated with slot 3, and LPP N is associated with slot N.

A version of bit vector 1102 could be associated with each partition, grid-cell, or other aggregation of objects (collectively referred to as an "object container") in the hierarchical grid data structure. According to one embodiment, this is done only for a grid that represents an object of an instance type. The bit vector would be maintained to show existence of shapes on the associated LPPs in the descendent hierarchy for design masters of instances in that object container. For example, consider a grid-cell that is associated with a bit vector having the following slot entries:

1 0 1 . . . 1

These slots values for the bit vector indicate that shapes on LPP 1 exists in the descendent hierarchy for at least one instance in that grid-cell, since there is a bit value of "1" in slot 1 corresponding to LPP 1. The second slot has a bit value of "0" indicating that the LPP 2 associated with that slot 2 does not exist in the descendent hierarchy for any instance stored in the grid-cell. The third slot has a bit value of "1" indicating that the LPP 3 associated with slot 3 does exist in the descendent hierarchy for at least one instance in the grid-cell.

Therefore, if a search query needs to check for the existence of either LPP 1, 2, or 3 in the grid-cell (or any of the other LPPs tracked by the bit vector), the appropriate slot in the bit vector can be checked to perform the existence check. For example, assume that a search query needs to check for the existence of LPP 1 in this grid-cell. In this situation, the bit vector can be used to instantly and efficiently perform the existence check to check and affirmatively indicate that LPP 1 exists within the hierarchy for this grid-cell, since slot 1 corresponding to LPP 1 has a bit value of "1".

This highlights a key advantage of the bit vector structure, in that it allows a very efficient way to perform existence checks. The other advantage is that the bit vector can be created and maintained with very low overhead in terms of system resources. This is because the bit vector is a very lightweight structure that can be propagated with relatively low expense to the system. Moreover, maintenance costs are also relatively low since such maintenance merely involves the setting of a relatively small number of bits in the bit vector.

There are different options that can be taken to implement the bit vectors. One option as shown in FIG. 11 is to maintain a slot in the bit vector for every unique LPP in the design. While still very efficient in terms of space consumption, this approach means that a design having a large number of LPPs would require a large bit vector having a large number of slots, with an individual slot to accommodate each and every LPP.

Figure 12:
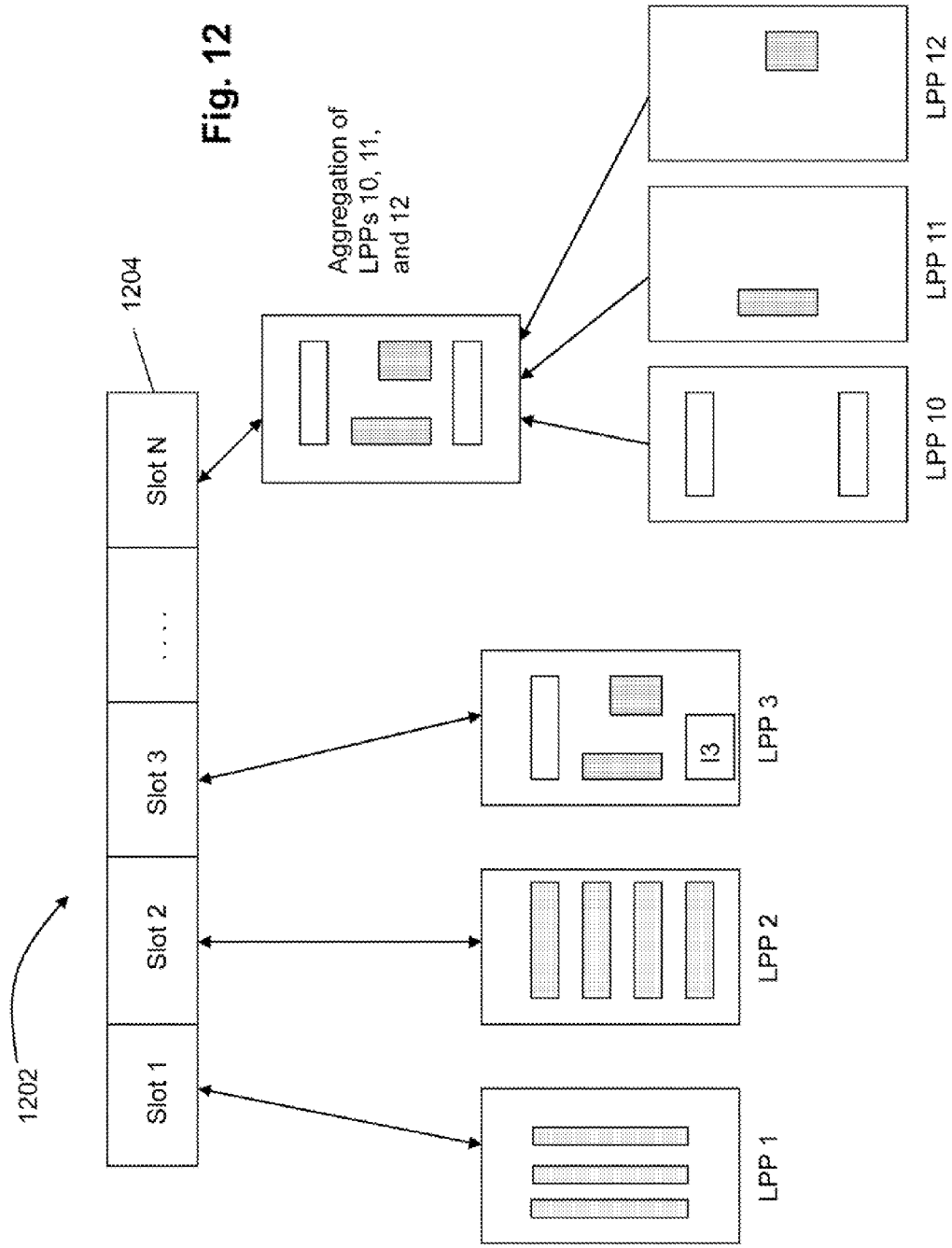

An alternative approach is shown in FIG. 12, in which the bit vector is configured to have a limited number of slots. Instead of assigning a separate slot for each unique LPP in the design, for a bit vector having N slots, only N−1 number of LPPs are assigned to individual slots in the bit vector. For example, for a bit vector having 64 slots, only 63 unique LPPs are assigned to individual slots in the bit vector.

In the approach of FIG. 12, the last slot N corresponds to an aggregation of all other LPPs in the design that do not correspond to an individual slot in the bit vector. In effect, the existence of the other LPPs is considered in the aggregate when determining the bit value for the last slot. Therefore, for last slot N, a bit value of "1" indicates that at least one of the other LPPs exist for the descendent hierarchy of instances in the container, without specificity of which of the LPPs is being referenced by the affirmative bit value. A bit value of "0" would indicate that none of the other LPPs are present in the container.

In this approach, some criterion can be used to sort the LPPs so that the first N−1 LPPs in the sorted ordering are assigned to the individual slots. For example, a reasonable sorting criterion can be based upon the number of instances in the entire hierarchy that use a specific LPP. Therefore, a fixed number of unique slots/indices in the bit vector are assigned to LPPs sorted in descending order—LPPs beyond the fixed number are assigned the same index.

According to some embodiments, the number of slots assigned to individual LPPs is a fixed number, e.g., permanent fixing of the bit vector at 64 slots. According to an alternative approach, the length of the bit vector is configurable and can be altered based upon the specific usage and numbers of LPPs in the design. For example, it could be that there are 1000 LPPs used in the design, but an analysis of the sorted ordering for the LPPs indicates that there are 100 individual LPPs which make up the vast majority of the LPPs. In this situation, it may be more efficient to use a heuristic to custom configure the system so that the bit vector includes 101 slots, where the top 100 frequently-used LPPs are assigned to individual slots and the other 900 infrequently-used LPPs are aggregated for the last slot in bit vector. Other embodiments may use a heuristic or optimization algorithm to determine the length of the bit vector and how the LPPs are assigned to bits. Some embodiments may aggregate LPPs into groups where several groups have more than one LPP, and each group is assigned to a particular bit. Other embodiments may reserve some bits for additional LPPs that become used in the design as it is edited.

A key aspect to efficient maintenance of the bit vectors is related to where and how the existence information is generated in the first place. Each master design implicitly tracks the contributed LPPs from its descendent hierarchy and shapes contained within the design. This is typically an intrinsic feature of the database. However, the assignment of the LPPs to specific indices may not be consistent across all the master designs currently in memory.

Once all the LPPs used in a design hierarchy are sorted, a canonical ordering can be imposed on the LPPs used in all the designs. This ordering is used to re-order the existence bits that are stored in every master design. In the hierarchical grids, a pointer can be stored to the master design structure that contains this existence information. Once the existence bits in the master designs have been appropriately ordered, the hierarchical grids and the containers within the hierarchical grids are updated to correctly reflect this ordering. This process can be implemented very efficiently as a logical OR operation using the existence bits of the master designs for all the instances stored in that particular container.

Returning back to FIG. 10, after the actions to create the bit vectors, the process may optionally create and/or maintain auxiliary structures for the existence checks at 1006, where the auxiliary structures are stored at 1008. These structures are used to perform existence checking with respect to other criteria, in addition to LPPs. For example, maximum dimension criteria may be used for the auxiliary structure, where an existence check is implemented by checking whether any shapes exist in the descendent instance hierarchy whose maximum dimension is greater than a specific filter size. Other criteria besides LPP and maximum dimension could also be used. For example, additional criteria can be established to check whether any polygons exist in the descendent instance hierarchy with non-orthogonal edges, whether any ellipses exist, or whether there any multi-line text labels. These criteria could be specific to a given LPP, or they could be tracked independently from LPPs if they correspond to attributes of non-LPP objects.

Figure 13:
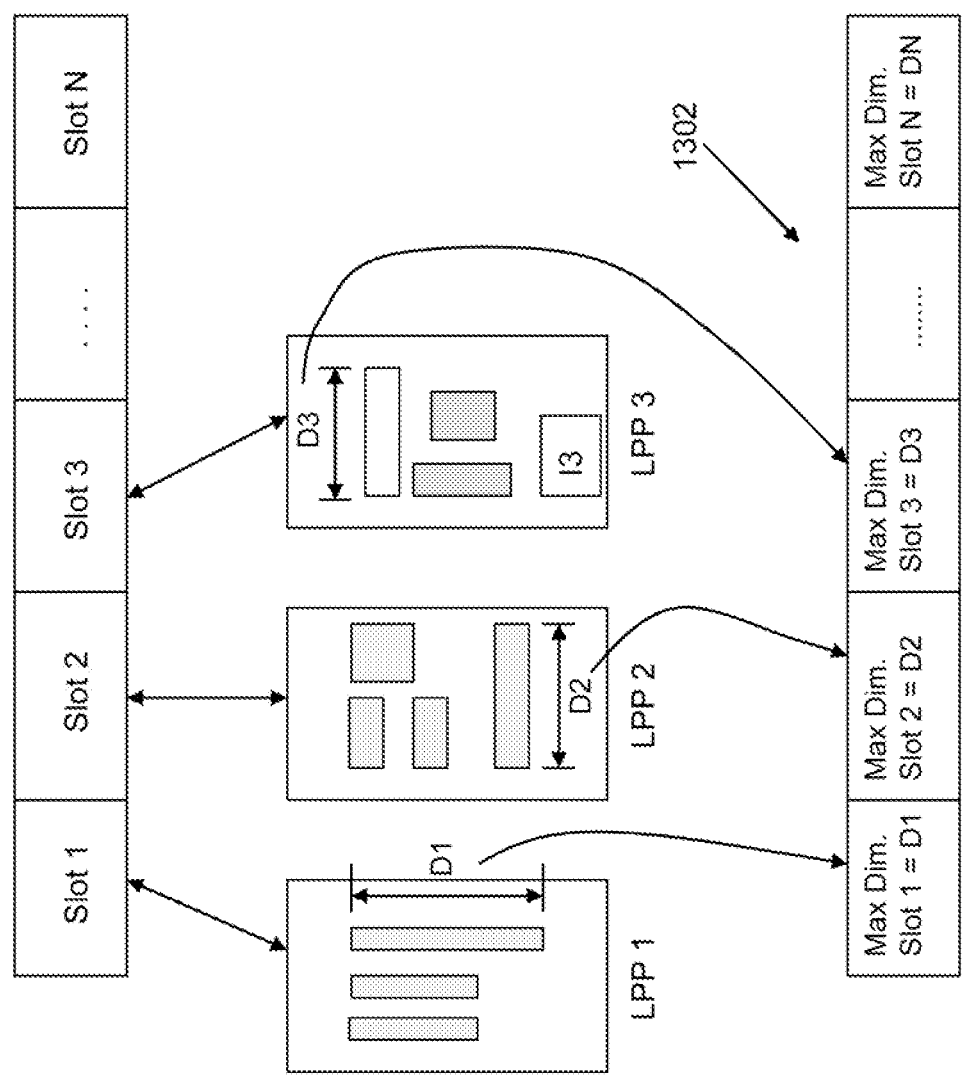
FIG. 13 illustrates an example approach to implement structures to perform space pruning.

FIG. 13 shows an example auxiliary structure 1302 that can be used to track the maximum dimensions for LPPs in the design. Each slot in the structure 1302 corresponds to the maximum dimension for a different LPP. As shown in this figure, the maximum dimension D1 for the shapes in LPP 1 would be stored in slot 1 of structure 1302. Similarly, the maximum dimension D2 for the shapes in LPP 2 would be stored in slot 2 of structure 1302. The maximum dimension D3 for the shapes in LPP 3 would be stored in slot 3 of structure 1302.

For an approach in which a separate slot is maintained for each LPP, then slot N will include the maximum dimension of shapes for LPP N. For an approach in which there are a limited number N of slots in structure 1302 and the number of LPPs exceeds N, then slot N will be the maximum dimension of an aggregation of LPPs.

To perform existence checks using these structures, the system would calculate a minimum dimension required for a shape to make that shape visible under the desired magnification level for the layout editor. The maximum dimension for an LPP would be checked to see if there are any shapes within the LPP that meet or exceed the minimum viewable dimension. If not, then the LPP/container does not need to be processed for the query.

According to some embodiments of the invention, the auxiliary structure 1302 does not need to be replicated throughout the system. Instead, a single copy of the structure is referenced for multiple containers. This is because the same maximum dimension value on a LPP should be same for every instance of a particular design master, even if the instances are associated with different containers. In an alternate embodiment, for performance improvements, the maximum dimension values are replicated so that local copies of structure 1302 are provided for faster access of the data.

Recall that FIGS. 14A-B illustratively showed a design hierarchy (FIG. 14A) upon which hierarchical grids may be implemented to track layout objects (14B). FIG. 14C showed that if shadow structures are used, then the shadows need to be proliferated through the design, e.g., for each LPP, at each relevant level, for each relevant instance. This proliferation of shadow structures could be very costly both to create and maintain.

Figure 14D:
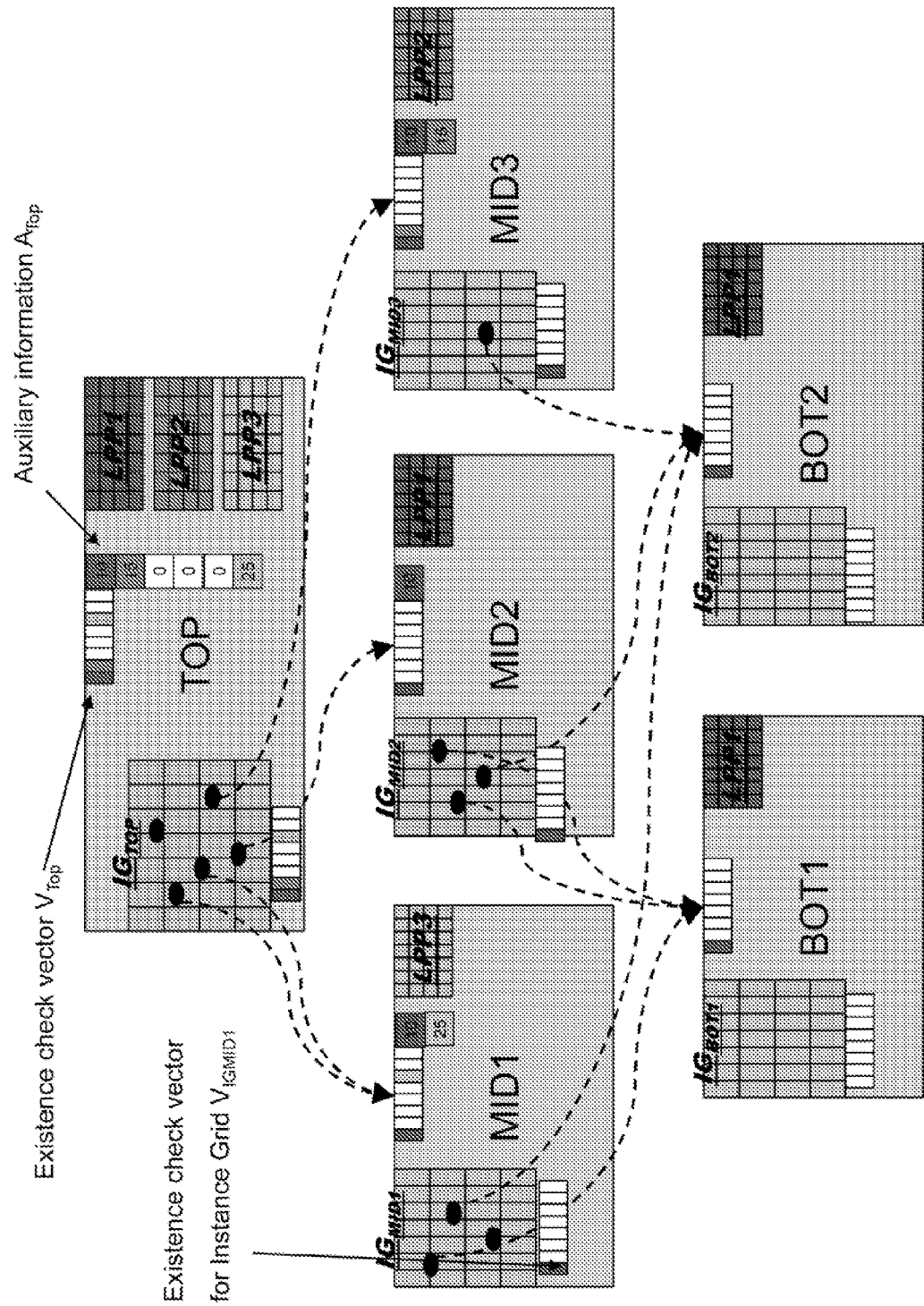

FIG. 14D illustrates how the existence check vectors described herein can be used to track existence check information in a much more efficient way. For example, Top is associated with the lightweight existence check vector $V_{Top}$ to track the existence of each design in the descendent hierarchy below Top. Instead of undergoing the expense of creating a shadow to maintain existence information, the existence check vector $V_{Top}$ is implemented using a lightweight structure having a vector of bits to track each different LPP/design in the hierarchy. Each of the other instances in this hierarchy is similarly associated with a similar type of existence check vector.

As previously described, the existence check vector may be associated with additional structures to track auxiliary information. As shown in FIG. 14D, the existence check vector $V_{Top}$ may be associated with auxiliary information structure $A_{Top}$, e.g., to identify the maximum dimensions of any object associated with each LPP being tracked in the existence check vector $V_{Top}$.

Figure 14E:
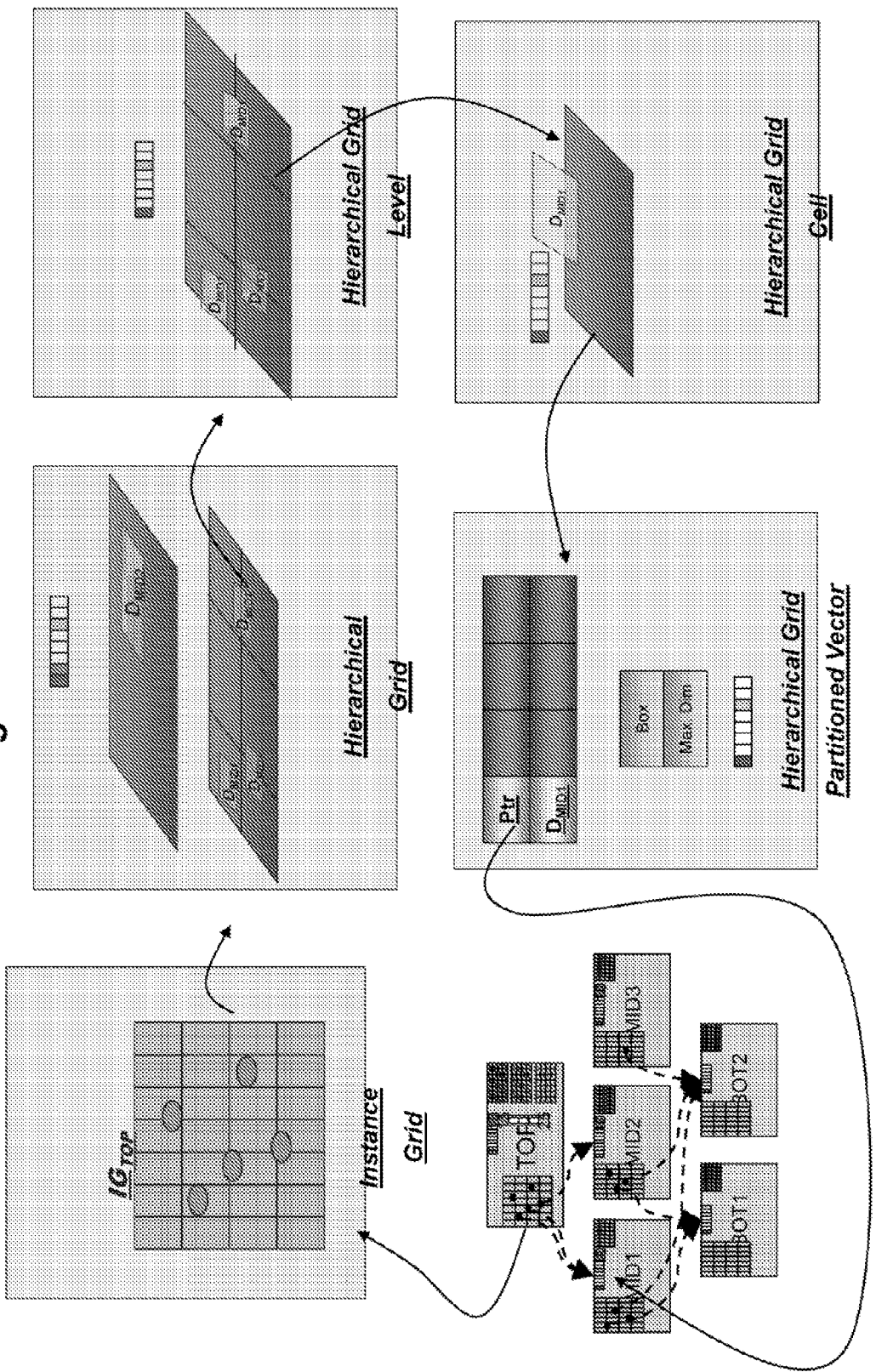

FIG. 14E shows the additional information stored in the instance grid of each design. This figure shows how the existence information can be stored at each container level in the hierarchy. In particular, it can be seen that the existence information is stored per each container in the instance grid. The representation for each container independently shows how the existence information and max dimension information is associated with that container level.

Back pointers are stored in the instance grid from the instances to their respective masters to enable the efficient computation of the existence bit vectors at each level.

After the LPPs have been canonically ordered and the existence bit vectors for each design in the design hierarchy shown in FIG. 14D have been established, the hierarchy of existence vectors in FIG. 14E are populated in a bottom-up fashion. The back pointers stored in the grid-cell are used to retrieve the existence information from the corresponding design master. The existence information for each of the masters corresponding to the instances associated with a partition is merged (using a bitwise OR operation) to create an existence vector for the partition. In a similar fashion, the existence information for all the partitions are merged together to create an existence vector for the grid-cell. The procedure moves up the container hierarchy through grid-level and concludes when the existence information for the instance grid is computed. Note that the existence information for the instance grid corresponds to the LPPs used in all the masters corresponding to instances in the instance grid, while the existence information for the design containing those instances also reflects the shapes within that design. To illustrate this distinction with an example, consider FIG. 14D again. The existence vector for design MID1 indicates that LPP1 and LPP3 are true, indicating contributions to these LPPs from the design itself and its descendent hierarchy. However, the existence vector for the instance grid corresponding to MID1, $IG_{MID1}$ only indicates that LPP1 is true, signifying that the descendent hierarchy below MID1 (instances of designs BOT1 and BOT2) only contribute shapes on LPP1.

Therefore, what has been described is an improved approach for managing layout objects that provides the ability to perform both existence checks and space pruning, but which require minimal resources and expenses to the processing system.

System Architecture Overview

Figure 20:
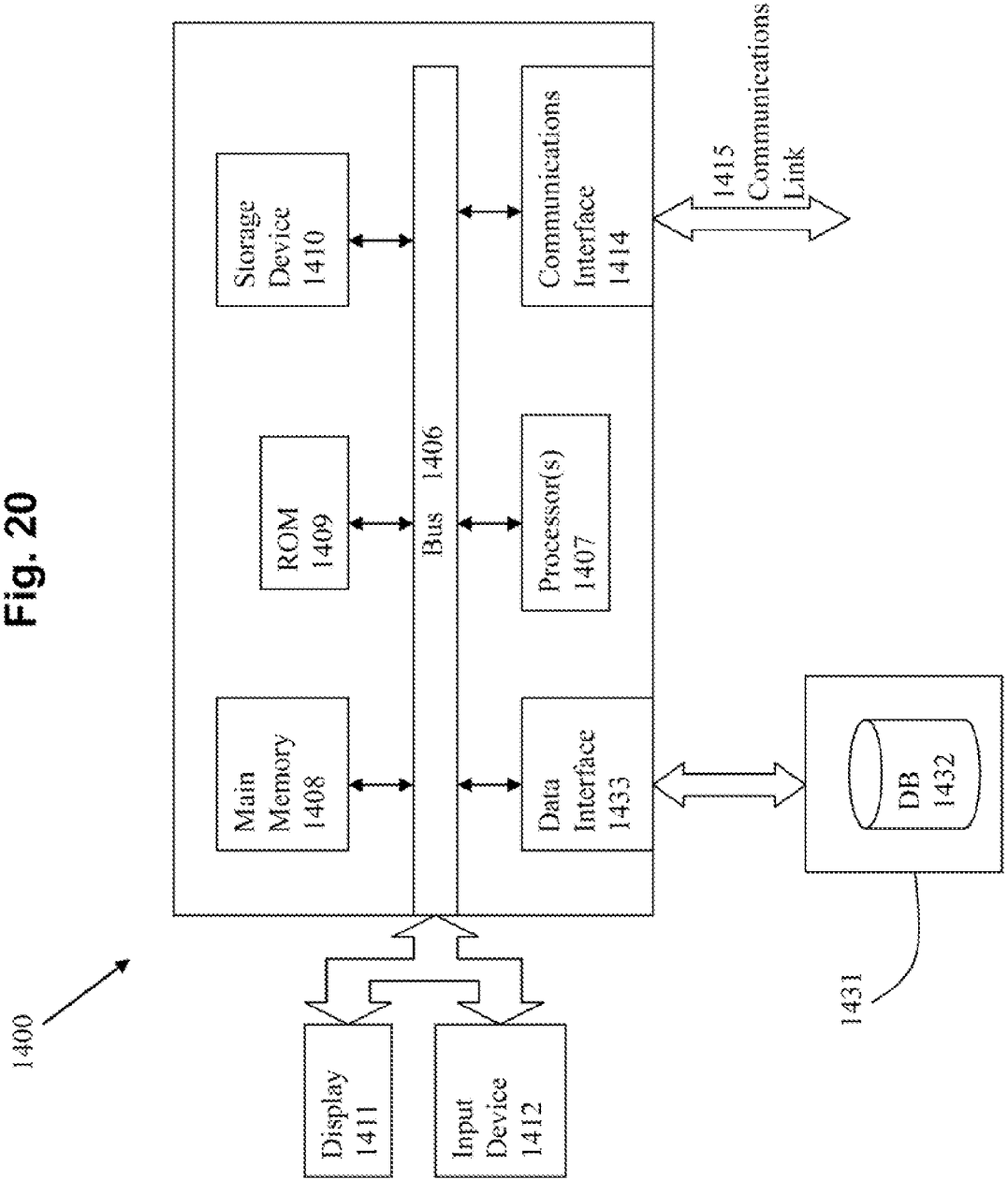
FIG. 20 shows an example computing system with which embodiments of the invention may be implemented.

FIG. 20 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g.; modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for managing hierarchical layout data, comprising:
   using at least one processor to perform a process, the process comprising:
   configuring a set of hierarchical grids, wherein
   the set of hierarchical grids comprise different sizes of grid-cells at different levels of the hierarchy, and
   the set of hierarchical grids corresponds to equal-sized physical partitions at each level;
   assigning a set of layout objects to at least some of the grid-cells within the set of hierarchical grids based at least in part upon one or more sizes or locations of the set of layout objects by using one or more canonical assignments, wherein the set of grid-cells comprises multiple levels of granularity including a finest level of granularity that is greater than a smallest feature size in the hierarchical layout data; and
   dividing at least some of the set of layout objects assigned to a grid-cell into multiple logical partitions to achieve balanced performance in processing the grid-cells, wherein the logical partitions act as a stack of sieves and do not correspond to equal-sized physical partitions.

2. The computer implemented method of claim 1 wherein a higher level hierarchical grid-cell comprises a larger size than a lower level hierarchical grid-cell.

3. The computer implemented method of claim 2 in which a first object in the layout data corresponding to a first larger size is assigned to the higher level hierarchical grid-cell and a second object corresponding to a second smaller size is assigned to the lower level hierarchical grid-cell.

4. The computer implemented method of claim 2 in which an object is sieved by the set of hierarchical grids, such that the object is assigned to the grid-cell at a hierarchical level based upon object size corresponding to a grid-cell size for the hierarchical level.

5. The computer implemented method of claim 1 in which the set of hierarchal grid corresponds to a depth association rule and a grid-cell association rule.

6. The computer implemented method of claim 1 in which an object is assigned to a grid-cell based upon a location for the lower left corner of the object.

7. The computer implemented method of claim 1 in which a criterion for the logical partitioning corresponds to the locations of the layout objects or the sizes of the set of layout objects assigned to the grid-cell.

8. The computer implemented method of claim 7 in which the set of layout objects are sorted.

9. The computer implemented method of claim 8 in which the set of layout objects are sorted by the location or by the size of the layout objects.

10. The computer implemented method of claim 1 in which the set of layout objects are assigned to logical partitions to spread the layout objects among multiple ones of the logical partitions.

11. The computer implemented method of claim 1 in which a vector is utilized to track the set of layout objects in the logical partitions, where an object is associated with a slot in the vector.

12. The computer implemented method of claim 1 in which search criteria information is tracked.

13. The computer implemented method of claim 12 wherein the search criteria information comprises a maximum dimension, minimum dimension, or a merged box.

14. The computer implemented method of claim 1 in which the set of hierarchical grids is controllably implemented.

15. The computer implemented method of claim 14 in which the set of hierarchical grids is controllably implemented using a heuristic or optimization algorithm to optimize the characteristics of the hierarchical grid structure for a particular objective or set of objectives.

16. The computer implemented method of claim 15 in which the heuristic or optimization algorithm controls a depth and granularity of partitioning in the set of hierarchical grids.

17. The computer implemented method of claim 16 in which the granularity of the set of hierarchical grids is selected to spread the set of layout objects relatively evenly across levels of the set of hierarchical grids.

18. The computer implemented method of claim 16 in which a histogram of object sizes is employed to determine the granularity.

19. The computer implemented method of claim 16 in which the depth is determined by analysis of object size differences, or object sizes.

20. The computer implemented method of claim 16 in which a histogram is employed to determine incremental expansion parameters, a termination criterion, and/or sizes of grid-cells.

21. A computer program product comprising a non-transitory computer accessible medium having stored thereupon a sequence of instructions which, when executed by at least one processor, causes the at least one processor to execute a method for managing hierarchical layout data, the method comprising:
using at least one processor to perform a process, the process comprising:
configuring a set of hierarchical grids, wherein
the set of hierarchical grids comprise different sizes of grid-cells at different levels of the hierarchy, and
the set of hierarchical grids corresponds to equal-sized physical partitions at each level;
assigning a set of layout objects to at least some of the grid-cells within the set of hierarchical grids based at least in part upon one or more sizes or locations of the set of layout objects by using one or more canonical assignments, wherein the set of grid-cells comprises multiple levels of granularity including a finest level of granularity that is greater than a smallest feature size in the hierarchical layout data; and
dividing at least some of the set of layout objects assigned to a grid-cell into multiple logical partitions to achieve balanced performance in processing the grid-cells, wherein the logical partitions act as a stack of sieves and do not correspond to equal-sized physical partitions.

22. The computer program product of claim 21, in which the one or more canonical assignments are used to assign an object to a hierarchical level having a depth in multiple hierarchies of the hierarchical layout data based at least in part upon a criterion.

23. The computer program product of claim 22, in which the criterion comprises a relationship between a grid-cell size at the hierarchical level and a size of the object.

24. The computer program product of claim 21, in which an object is sieved by the set of hierarchical grids, stich that the object is assigned to the grid-cell at a hierarchical level based upon object size corresponding to a grid-cell size for the hierarchical level.

25. The computer program product of claim 21, in which a logical partition of the logical partitions is utilized to allow a query mechanism to skip an extraneous object that does not match a search criterion.

26. A system for managing hierarchical layout data, the method comprising:
at least one processor that is to:
configure a set of hierarchical grids, wherein
the set of hierarchical grids comprise different sizes of grid-cells at different levels of the hierarchy, and
the set of hierarchical grids corresponds to equal-sized physical partitions at each level;
assign a set of layout objects to at least some of the grid-cells within the set of hierarchical grids based at least in part upon one or more sizes or locations of the set of layout objects by using one or more canonical assignments, wherein the set of grid-cells comprises multiple levels of granularity including a finest level of granularity that is greater than a smallest feature size in the hierarchical layout data; and
divide at least some of the set of layout objects assigned to a grid-cell into multiple logical partitions to achieve balanced performance in processing the grid-cells, wherein the logical partitions act as a stack of sieves and do not correspond to equal-sized physical partitions.

27. The system of claim 26, in which the at least one processor is to use the one or more canonical assignments to assign an object to a hierarchical level having a depth in multiple hierarchies of the hierarchical layout data based at least in part upon a criterion.

28. The system of claim 27, in which the criterion comprises a relationship between a grid-cell size at the hierarchical level and a size of the object.

29. The system of claim 26, in which an object is sieved by the set of hierarchical grids, stich that the object is assigned to the grid-cell at a hierarchical level based upon object size corresponding to a grid-cell size for the hierarchical level.

30. The system of claim 26, in which a logical partition of the logical partitions is utilized to allow a query mechanism to skip an extraneous object that does not match a search criterion.

* * * * *